United States Patent
Khayim et al.

(10) Patent No.: US 7,308,210 B2
(45) Date of Patent: Dec. 11, 2007

(54) OPTICAL MODULATING DEVICE, OPTICAL TRANSMITTING APPARATUS USING THE SAME, METHOD OF CONTROLLING OPTICAL MODULATING DEVICE, AND CONTROL PROGRAM RECORDING MEDIUM

(75) Inventors: Tattee Khayim, Kawasaki (JP); Ko Koga, Kitakyushu (JP); Hiroyuki Agatsuma, Kitakyushu (JP); Mitsuru Sugawara, Kawasaki (JP); Sadao Tanikoshi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 679 days.

(21) Appl. No.: 10/407,520

(22) Filed: Apr. 3, 2003

(65) Prior Publication Data

US 2003/0210914 A1 Nov. 13, 2003

(30) Foreign Application Priority Data

Apr. 5, 2002 (JP) ............................. 2002-104387
Sep. 25, 2002 (JP) ............................. 2002-279748

(51) Int. Cl.
*H04B 10/04* (2006.01)

(52) U.S. Cl. ..................................... 398/198

(58) Field of Classification Search ............... 398/198, 398/195, 197

See application file for complete search history.

(56) References Cited

U.S. PATENT DOCUMENTS

| | | | | |
|---|---|---|---|---|
| 5,170,274 A | * | 12/1992 | Kuwata et al. ............. | 398/198 |
| 5,440,113 A | * | 8/1995 | Morin et al. ................ | 250/205 |
| 5,521,749 A | * | 5/1996 | Kawashima ................ | 359/325 |
| 6,317,247 B1 | * | 11/2001 | Yang et al. ................. | 359/245 |
| 6,362,913 B2 | * | 3/2002 | Ooi et al. ................... | 359/245 |
| 6,559,996 B1 | * | 5/2003 | Miyamoto et al. .......... | 398/183 |
| 6,836,622 B2 | * | 12/2004 | Kobayashi et al. ......... | 398/198 |
| 7,006,769 B1 | * | 2/2006 | Kawasaki et al. .......... | 398/158 |
| 2002/0001116 A1 | * | 1/2002 | Kajiya et al. ............... | 359/187 |

FOREIGN PATENT DOCUMENTS

JP 03-251815 11/1991

(Continued)

OTHER PUBLICATIONS

A. J. Price et al., "Reduced bandwidth optical digital intensity modulation with improved chromatic dispersion tolerance", Electronics Letter, Jan. 5, 1995, vol. 31, No. 1, pp. 58-59.

*Primary Examiner*—Shi K. Li
(74) *Attorney, Agent, or Firm*—Hogan & Hartson LLP

(57) ABSTRACT

An optical modulating device including a driving circuit generating a driving voltage corresponding to an input signal, an oscillator generating a signal having a low frequency signal lower than that of the input signal, an MZ modulator receiving a DC bias voltage superposed with the low frequency signal and the driving voltage, to generate a modulated optical signal according to the input signal, a photoelectric converting unit for converting the modulated optical signal into an electric signal, a low frequency signal detecting circuit which extracts the low frequency signal component contained in the electric signal, multiplies the low frequency signal component by the low frequency signal outputted by the low frequency oscillator, and then extracts a DC component from a multiplied output signal, and a control circuit for extracting a maximized DC component from the low frequency signal detecting circuit by controlling the DC bias voltage.

4 Claims, 17 Drawing Sheets

FOREIGN PATENT DOCUMENTS

| | | |
|---|---|---|
| JP | 05-204002 | 8/1993 |
| JP | 06-067128 | 3/1994 |
| JP | 07-013113 | 1/1995 |
| JP | 09-061768 | 3/1997 |
| JP | 10-048582 | 2/1998 |
| JP | 2000-162563 | 6/2000 |
| JP | 2001-350128 | 12/2001 |
| JP | 2003-295138 | 10/2003 |

* cited by examiner

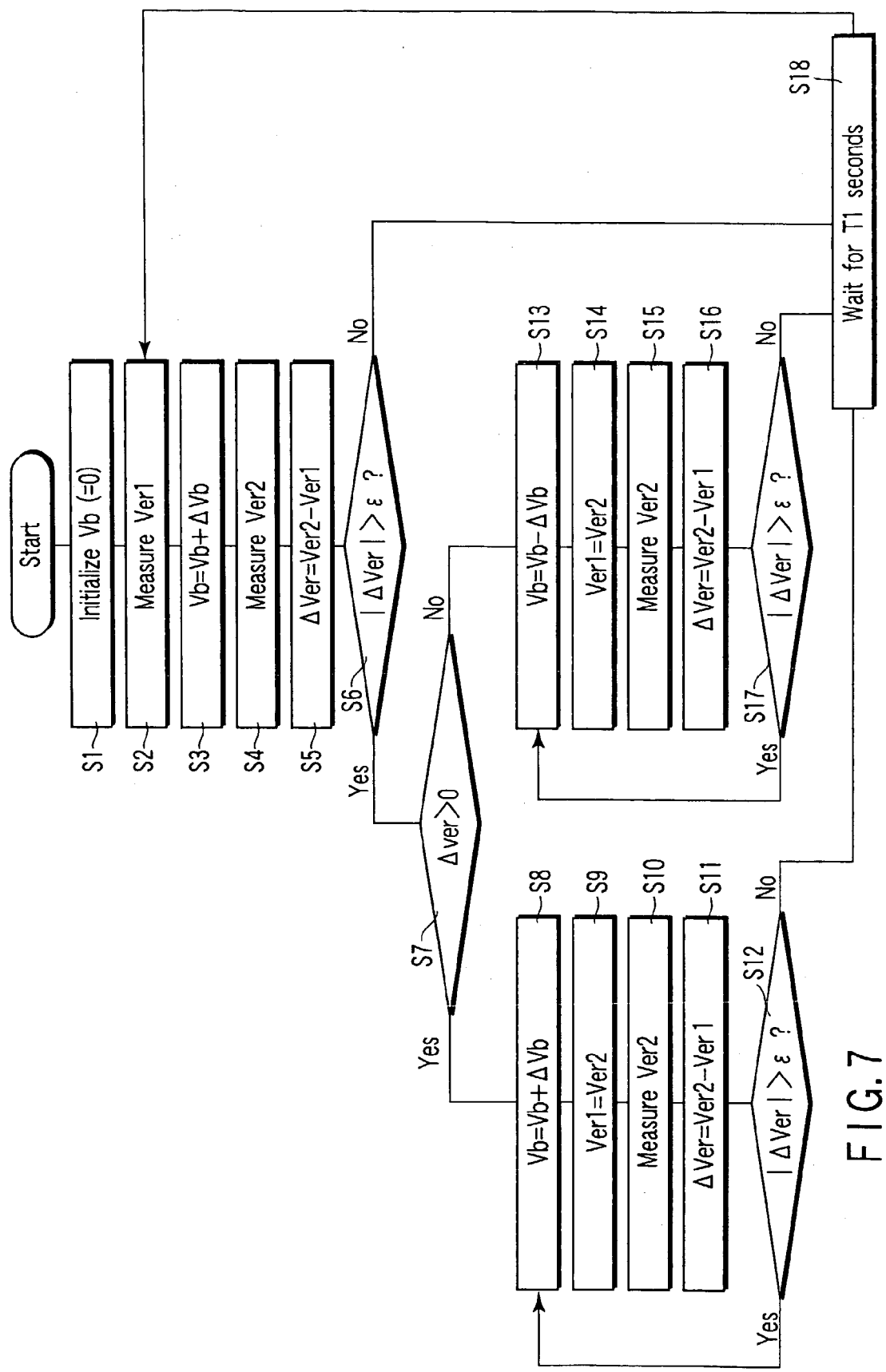
F I G. 7

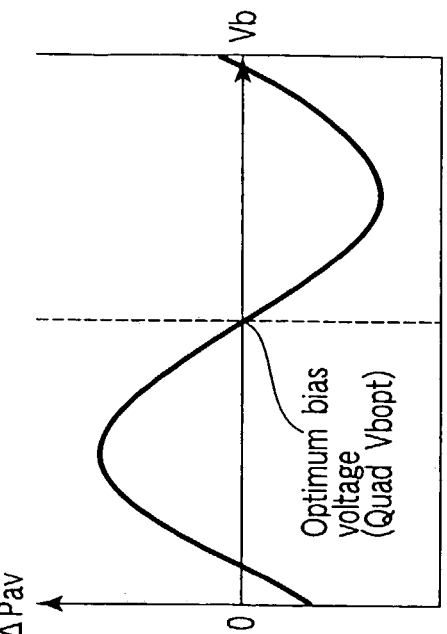
F I G. 13
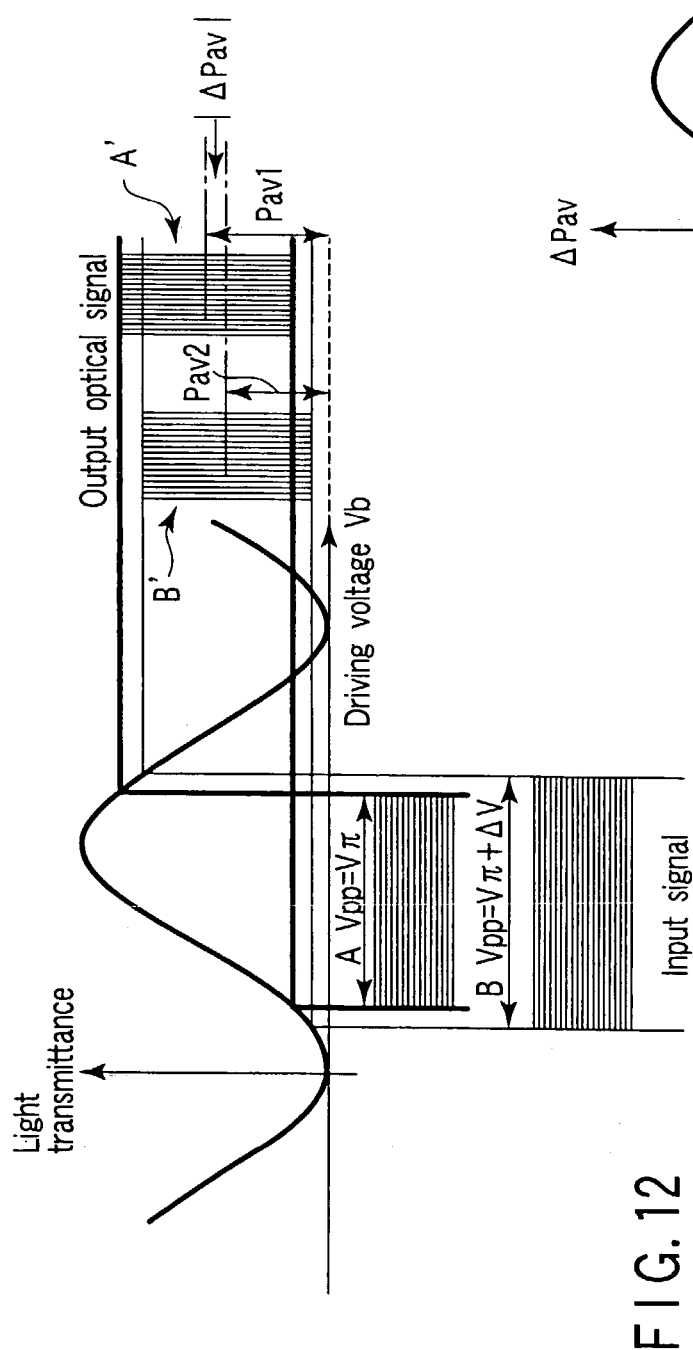
F I G. 12

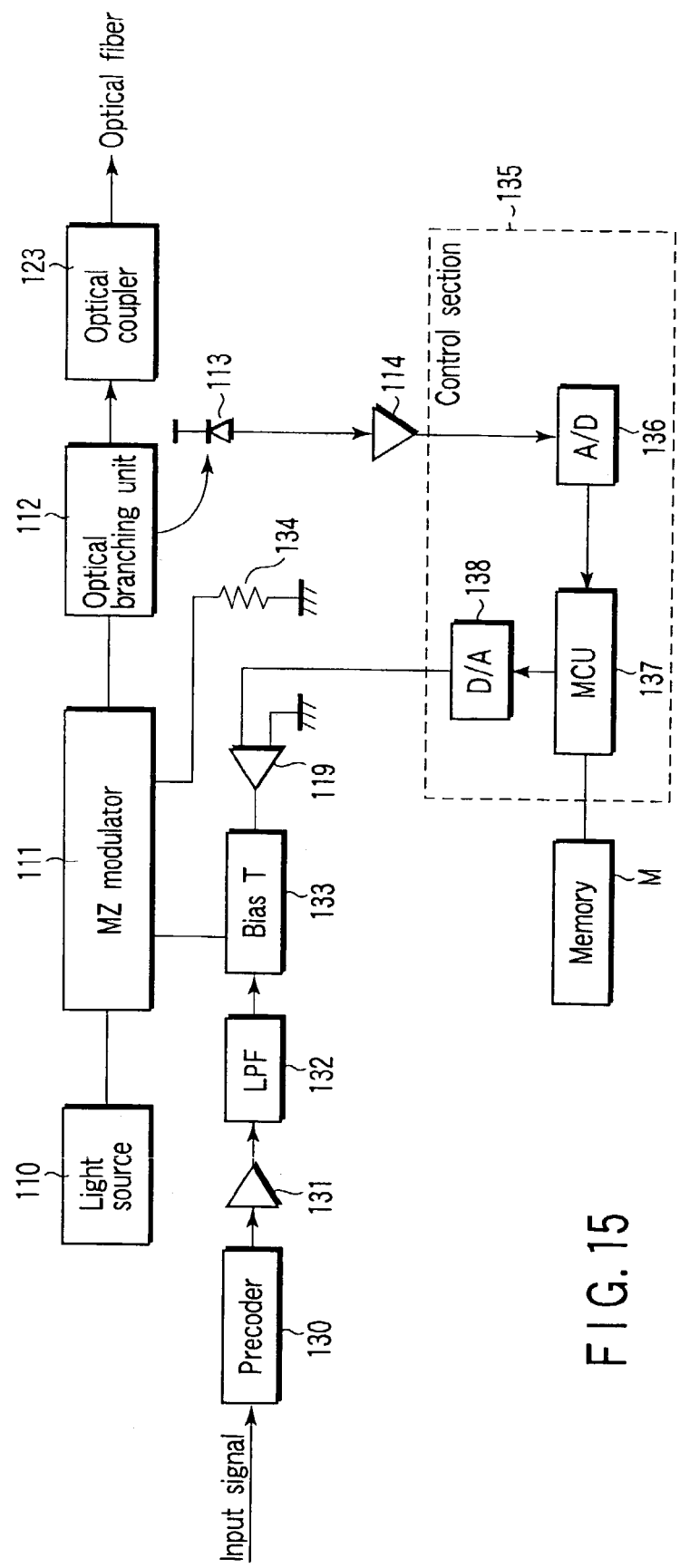
F I G. 15 mod(i,3·res)

mod(i,3·res)

mod(i,3·res)

mod(i,3·res)

OPTICAL MODULATING DEVICE, OPTICAL TRANSMITTING APPARATUS USING THE SAME, METHOD OF CONTROLLING OPTICAL MODULATING DEVICE, AND CONTROL PROGRAM RECORDING MEDIUM

CROSS-REFERENCE TO RELATED APPLICATIONS

This application is based upon and claims the benefit of priority from the prior Japanese Patent Applications No. 2002-104387, filed Apr. 5, 2002; and No. 2002-279748, filed Sep. 25, 2002, the entire contents of both of which are incorporated herein by reference.

BACKGROUND OF THE INVENTION

1. Field of the Invention

The present invention relates to an optical modulating device, an optical transmitting apparatus using the optical modulating device, a method of controlling the optical modulating device, and a control program recording medium used for the control method, and in particular, to a control technique of stabilizing an optical signal outputted by a Mach Zehnder modulator (hereinafter simply referred to as an "MZ modulator") used as a part of an electric/optical converter. This technique is used for, for example, a long-distance high-speed optical fiber communication network.

2. Description of the Related Art

Among conventional modulating methods for optical transmitting apparatuses in an optical communication system using high-speed optical fibers, there is a direct modulating method in which a semiconductor laser is driven by a digital input signal, thereby directly carrying out electric/optical conversion. However, as a bit rate of the digital input signal increases, it becomes difficult to achieve long-distance optical-fiber transmissions using the direct modulating method, owing to the adverse effects of variations (chirping) in the wavelength of an output optical signal or dispersion of the transmission light in optical fibers.

Thus, an MZ modulator, which is an external modulator, has been introduced. This, in principle, avoids variations in wavelength. Further, for an optical transmitting apparatus using the MZ modulator, transmitted outputs (optical signals) must be stabilized so as not to be affected by variations in temperature, age deterioration, and the like, so that an optical communication system can always operate stably.

FIG. 1 shows an example of the relationship (light transmittance) between a driving voltage and an output optical signal, the driving voltage varying according to the amplitude of an electric signal inputted to an MZ modulator. In this description, the input signal is a binary digital signal.

In FIG. 1, the difference between the driving voltage of the input electric signal obtained at the maximum value (peak) of the light transmittance and the driving voltage obtained at the minimum value (zero or null) of the light transmittance is defined as "Vπ". The point at which the light transmittance has an intermediate value between the maximum and minimum values and at which the characteristic curve has a positive inclination is called as "QUAD point". A driving voltage corresponding to the QUAD point is defined as "Vquad".

Further, the driving voltages for the MZ modulator corresponding to logical values "0" and "1" of the input electric signal are defined as V0 and V1. An intermediate value (V0+V1)/2 is called a "bias voltage Vb (an operating point of the MZ modulator).

In FIG. 1, an optical transmission characteristic curve A indicates that the operating point of the MZ modulator is optimum (the relationship between the input electric signal and the optical transmission characteristic is optimum). An output optical signal obtained in this case is shown at A'.

Efficient optical modulation can be accomplished by thus driving the MZ modulator using the driving voltages V0 and V1, with which the light transmittance of the MZ modulator has its maximum and minimum values, respectively. It is thus possible to transmit an optical signal in which the ratio of the maximum transmittance to the minimum transmittance, i.e. an optical extinction ratio is high. In this case, the difference between V0 and V1 equals the Vπ. Further, the value Vb equals the value Vquad.

On the other hand, the optical transmission characteristic of the MZ modulator is subject to a change (operating point drift) called a "DC drift" due to variations in DC bias voltage, temperature, aging, etc. As a result, output optical signals may be degraded.

In FIG. 1, curves B and B' indicate an optical transmission characteristic and an output optical signal observed if a DC drift occurs in an initial state indicated by curves A and A'. That is, the DC drift is a phenomenon in which the optical transmission characteristic is shifted in the direction of abscissa in FIG. 1.

If a DC drift occurs and the driving voltage then has the same value as that in its initial state, the waveform of the output optical signal B' and its optical extinction ratio are degraded as shown in FIG. 1. This DC drift must be compensated. That is, if a DC drift occurs, it must be compensated by considering the magnitude of the drift to be the magnitude of a change in the driving voltage and then changing the values of the driving voltages V0 and V1 by the magnitude of the change in voltage ΔVb. This compensation can be equivalently carried out by changing the bias voltage Vb by ΔVb.

For example, Jpn. Pat. Appln. KOKAI Publication No. 3-251815 "Method of Controlling External Modulator" discloses a conventional control method of compensating for a DC drift in the MZ modulator to allow the modulator to operate stably. A control circuit for carrying out the method is configured, for example, as shown in FIG. 20.

According to the principle of this control method, a low-frequency superposing circuit 141 first superposes a low-frequency signal (normalized signal) transmitted by a low-frequency transmitter 147 and having a normalized frequency, on an input signal (modulates the amplitude of the input signal using the normalized signal). An output from the low-frequency superposing circuit 141 is then inputted to an MZ modulator 143 via a driving circuit 142. The low-frequency signal from the low-frequency oscillator 147 is also supplied to a low-frequency signal detecting circuit 145.

The MZ modulator 143 uses a signal provided by the driving circuit 142 to modulate light emitted by a semiconductor laser light source 144 so as to convert it into an optical modulated signal. The MZ modulator 143 then outputs the optical modulated signal to an optical transmission path 148. A part of the optical signal is branched and inputted to the low-frequency signal detecting circuit 145. A monitoring photodiode in the low-frequency signal detecting circuit 145 converts the inputted optical signal into an electric signal. This electric signal contains a low-frequency component of the normalized signal. This frequency component of the normalized signal has its phase vary through 180° depending on the direction of an operating point drift. By multiplying the signal containing this frequency component by the normalized signal from the low-frequency oscillator 147 and then carrying out synchronous detection, it is possible to detect a positive or negative DC component (an error signal) dependent on the direction of the operating point drift. Thus, the operating point of the MZ modulator 143 can be optimally retained by causing a control circuit 146 to control the operating point so as to zero the DC component. This drift compensating operation is characterized by its relatively high speed.

Without any operating point drifts, an optical signal outputted by the MZ modulator 143 has its amplitude modulated at a frequency double the normalized frequency. Thus, this signal does not contain any frequency components of the normalized signal. In this case, no DC components are detected.

However, with the above conventional control method, the MZ modulator 143 is driven by a driving signal modulated by superposing a low-frequency sinusoidal wave on a very high-frequency input signal. It is thus essential to have the driving circuit (variable gain amplifier) 142 that has a wide dynamic range enough to linearly vary gain up to the maximum amplitude of this driving signal. It is technically difficult to realize such a high-output gain and high-speed variable gain amplifier having a wide dynamic range. Such a variable gain amplifier is also expensive.

Further, in FIG. 1, only if the difference between the driving voltages V0 and V1 for the MZ modulator 143, which correspond to the logical values of an input signal, equals the difference Vπ between a driving voltage obtained at the maximum light transmittance and a driving voltage obtained at the minimum light transmittance (Vb equals Vquad, i.e. the operating point of the MZ modulator 143 is optimum), then a control operation is performed correctly.

As described above, a problem with the conventional control method for an MZ type optical modulator is that it requires an expensive variable gain amplifier having a wide dynamic range. Another problem is that a control operation is performed incorrectly if the difference between the driving voltages V0 and V1 for the MZ modulator does not equal Vπ.

Further, an optical communication system using high-speed optical fibers generally uses an NRZ (Non Return to Zero) modulating method of carrying out optical modulation using an NRZ signal that is a binary digital signal. In this case, if an attempt is made to increase signal transmission capacity using a time division multiplexing (TDM) method, transmission distance may be limited by degradation of the waveform of the transmission signal caused by the dispersion (GVD) of wavelengths in the transmitted optical signal. Further, dispersion tolerance is in inverse proportion to the square of a data bit rate. Accordingly, given that the dispersion tolerance is about 800 ps/nm in a 10-Gb/s system, it decreases down to 1/16-th, i.e. about 50 ps/nm in a system with a quadruple bit rate, i.e. a 40-Gb/s system. It is thus difficult to put this system to practical use.

An optical duo binary modulating method has been proposed as a method of reducing the degradation of the waveform caused by the wavelength dispersion. Refer to, for example, A. J. Price et al., "Reduced bandwidth Optical Digital Intensity Modulation with Improved Chromatic Dispersion Tolerance", Electron. Lett., vol. 31, No. 1, pp. 58-59, 1995.

The optical duo binary modulating method reduces the bandwidth of an optical signal spectrum to about half to weaken the effects of the wavelength dispersion compared to the NRZ modulating method. For example, the bandwidth of an optical signal spectrum in a 10-Gb/s system has a frequency of 10 GHz and a wavelength of 0.1 nm with the NRZ modulating method. By contrast, it has a frequency of 5 GHz and a wavelength of 0.2 nm with the optical duo binary modulating method. That is, the optical duo binary modulating method reduces the bandwidth to half compared to the NRZ modulating method.

Light propagation speed varies depending on the wavelength. As the bandwidth of the optical signal spectrum increases, the magnitude of a variation in bit rate increases, which more markedly disrupts the waveform during long-distance transmissions. Thus, if the bandwidth of the optical signal spectrum can be reduced using the optical duo binary modulating method, the magnitude of a variation in bit rate decreases to enhance the dispersion tolerance.

FIG. 21 shows a configuration of a modulating section based on the conventional optical duo binary modulating method. The waveform diagram in FIG. 22 is provided in order to describe the optical duo binary modulating method.

In FIG. 21, reference numeral 151 denotes a semiconductor laser, and reference numeral 152 denotes an MZ type modulator. Reference numeral 153 denotes a precoder that encodes a binary NRZ input signal. Reference numeral 154 denotes a modulator driver that functions as an amplitude adjusting section. Reference numeral 155 denotes a low pass filter (LPF) having a pass band for a low frequency signal with a frequency that is about quarter a bit rate (BR). Reference numeral 156 denotes a bias adjusting circuit (bias T), and 157 denotes a terminator.

After being encoded by the precoder 153, a binary NRZ signal input has its amplitude adjusted by the modulator driver 154. The adjusted signal passes through the low pass filter 155 and is thus converted into a ternary signal. The converted signal is applied to a signal electrode of the MZ type modulator 152.

As shown in FIG. 22, the optical duo binary modulating method doubles the driving voltage Vb for the MZ type modulator 152 compared to the NRZ modulating method. Consequently, the MZ type modulator 152 is modulated at a driving amplitude (Vpp=2Vπ) double that of Vπ. Further, a DC bias voltage (the center of the driving voltage) is set so that the modulator is driven in between two adjacent ones P1 and P2 of periodic light emission peaks on a characteristic curve for driving voltage vs. optical output.

Now, operations of the circuit in FIG. 21 will be described with reference to FIGS. 19A to 19H.

FIGS. 19A and 19B show a binary NRZ input signal and its eye pattern. FIGS. 19C and 19D show an output signal from the precoder 153 and its eye pattern. FIGS. 19E and 19F show an output signal from the low pass filter 155 and its eye pattern. FIGS. 19G and 19H show an output optical signal from the MZ type modulator 152 and its eye pattern.

A comparison of FIG. 19A with FIG. 19G indicates the output optical signal from the MZ type modulator has exactly the same logic as the binary NRZ signal input. Accordingly, a receiver (not shown) that receives this optical signal can convert it into a binary NRZ signal without using any decoders.

The above optical duo binary modulating method is characterized by reducing the bandwidth of an optical signal spectrum to about half compared to the conventional NRZ modulating method. It can thus weaken the adverse effects of the wavelength dispersion to allow channels to be more densely arranged using a wavelength dispersion multiplexing (WDM) method. That is, if an attempt is made to increase the signal transmission capacity using the wavelength dispersion multiplexing technique, the wavelength band that can be amplified by an optical amplifier is a limiting factor. However, the channels can be more densely arranged within an amplification band of the optical amplifier by utilizing the narrow-band characteristic of an optical signal spectrum obtained by the optical duo binary modulating method.

As described above, the conventional optical duo binary modulating method using the MZ type modulator is disadvantageous in that an output optical signal is unstable owing to variations in the characteristics of the MZ type modulator. It is thus necessary to control the bias voltage in response to a variation in operating point so that an optical communication system based on the optical duo binary modulating method using the MZ type modulator always operates stably to stabilize transmission outputs (optical signals).

BRIEF SUMMARY OF THE INVENTION

According to an aspect of the present invention, there is provided an optical modulating device comprising a driving circuit which generates a driving voltage corresponding to an input signal which is a binary digital signal, a low-frequency oscillator which generates a low frequency signal having a sufficiently lower frequency than the input signal, a Mach Zehnder type optical modulator which is provided with a DC bias voltage on which the low frequency signal is superposed as well as the driving voltage, to modulate input light according to the driving voltage to convert the input signal into an optical signal, a photoelectric converting unit which converts the optical signal outputted by the Mach Zehnder type optical modulator, into an electric signal in which only a high frequency component of the input signal is averaged, a low frequency signal detecting circuit which extracts a frequency component of the low frequency signal contained in the electric signal, multiplies the frequency component by the low frequency signal outputted by the low frequency oscillator, and then extracts a DC component from a multiplied output signal, and a control circuit which controls the DC bias current so as to maximize the DC component extracted by the low frequency signal detecting circuit.

According to another aspect of the present invention, there is provided an optical modulating device comprising a driving circuit which generates a driving voltage corresponding to an input signal which is a binary digital signal, a Mach Zehnder type optical modulator which is provided with the driving voltage and a DC bias voltage to modulate input light according to the driving voltage to convert the input signal into an optical signal, an optical detecting circuit which detects an average optical output level representative of a time average of optical signals outputted by the Mach Zehnder type optical modulator, and a control circuit which includes a function of generating a control signal serving to binarily change an amplitude of the input signal at a frequency sufficiently lower than that of the input signal and which detects a difference between an average optical output level detected by the optical detecting circuit before a binary change in the amplitude of the input signal and an average output level detected by the optical detecting circuit after the binary change to control the DC bias voltage on the basis of a result of the detection.

According to yet another aspect of the present invention, there is provided a method of controlling an optical modulator, the method comprising providing a Mach Zehnder type optical modulator with a driving voltage corresponding to an input signal which is a binary digital signal and a DC bias voltage on which a low frequency signal having a sufficiently lower frequency than the input signal is superposed, to modulate input light according to the driving voltage to convert the input signal into an optical signal, converting the optical signal outputted by the Mach Zehnder type optical modulator, into an electric signal in which only a high frequency component of the input signal is averaged, extracting a frequency component of the low frequency signal contained in the electric signal, multiplying the frequency component by the low frequency signal superposed on the DC bias voltage, and extracting a DC component from a multiplied signal, and controlling the DC bias current so as to maximize the extracted DC component. According to another aspect of the present invention, there is provided a method of controlling an optical modulator, the method comprising providing a Mach Zehnder type optical modulator with a driving voltage corresponding to an input signal which is a binary digital signal and a DC bias voltage, to modulate input light according to the driving voltage to convert the input signal into an optical signal, and controlling a DC bias voltage on the basis of a difference between optical signal output average power of the optical modulator detected before a binary change in an amplitude of the input signal to the optical modulator and optical signal output average power of the optical modulator detected after the binary change.

According to yet another aspect of the present invention, there is provided a recording medium for a control program for an optical modulator, the recording medium containing a recorded program for causing a micro-control unit to control a DC bias voltage for an optical modulator on the basis of a difference between optical signal output average power of the optical modulator detected before a binary change in an amplitude of the input signal to the optical modulator and optical signal output average power of the optical modulator detected after the binary change.

According to still another aspect of the present invention, there is provided an optical modulating device comprising an optical modulator which has a driving voltage-optical output characteristic indicated by a curve in which an emission peak or an extinction peak is periodically repeated, is provided with a driving voltage corresponding to a ternary signal and centered at a DC bias voltage, modulates input light according to the driving voltage, and outputs a binary optical signal, a DC bias generating circuit which generates the DC bias voltage, a driving circuit which converts a binary NRZ signal input into a ternary signal, generates a driving voltage on the basis of the ternary signal, the driving voltage having a signal amplitude corresponding to two adjacent periodic emission or extinction peaks of driving voltage-optical output characteristic of the optical modulator, superposes the driving voltage on the DC bias voltage generated by the DC bias generating circuit, and supplies the superposed signal to the optical modulator, an optical detector which detects an average optical output level representative of a time average of optical outputs from the optical modulator, and a control circuit which determines the DC bias voltage on the basis of a difference between average optical output power of the optical modulator detected before a slight increase or decrease in DC bias voltage and average optical output power of the optical modulator detected after the slight increase or decrease.

According to another aspect of the present invention, there is provided a method of controlling an optical modulator, the method providing an optical modulator with a driving voltage corresponding to a ternary signal and a DC bias voltage to modulate input light according to the driving voltage and output an optical signal, detecting an average optical output power representative of time average of optical outputs from the optical modulator, and including a function of generating a control signal serving to binarily change the DC bias voltage at a frequency sufficiently lower than that of the ternary signal, detecting a difference between average optical output power detected before a binary change in DC bias voltage and average optical output power detected after the binary change, and controlling the DC bias voltage on the basis of a result of the detection.

According to yet another aspect of the present invention, there is provided a control program for an optical modulating device, the control program causing a micro-control unit to implement a function of detecting an average optical output level representative of time average of optical signals outputted by an optical modulator to which a driving voltage corresponding to a ternary signal and centered at a DC bias voltage is supplied as a modulation input, a function of generating a control signal serving to binarily change the DC bias voltage at a frequency sufficiently lower than that of an input signal, and a function of detecting a difference between an average optical output level detected before a binary change in DC bias voltage and an average optical output level detected after the binary change and controlling the DC bias voltage for the optical modulator on the basis of a result of the detection.

BRIEF DESCRIPTION OF THE SEVERAL VIEWS OF THE DRAWING

FIG. 7 is a flow chart illustrating operations performed by a peak position determining circuit in FIG. 3;

FIG. 12 is a characteristic diagram showing the relationship between an input signal and a corresponding output optical signal observed if the amplitude of a driving voltage for an MZ type modulator is varied, the diagram illustrating the operational principle of method of controlling the MZ type modulator shown in FIG. 11;

FIG. 13 is a characteristic diagram showing the relationship between the DC bias voltage for the MZ type modulator and an average power output from the MZ type modulator, the diagram illustrating the operational principle of method of controlling the MZ type modulator shown in FIG. 11;

FIG. 15 is a block diagram showing an optical transmitting apparatus using an optical modulating device and used for optical fiber communication according to a fourth embodiment of the present invention;

DETAILED DESCRIPTION OF THE INVENTION

Embodiments of the present invention will be described below in detail with reference to the drawings.

FIRST EMBODIMENT

Figure 2:
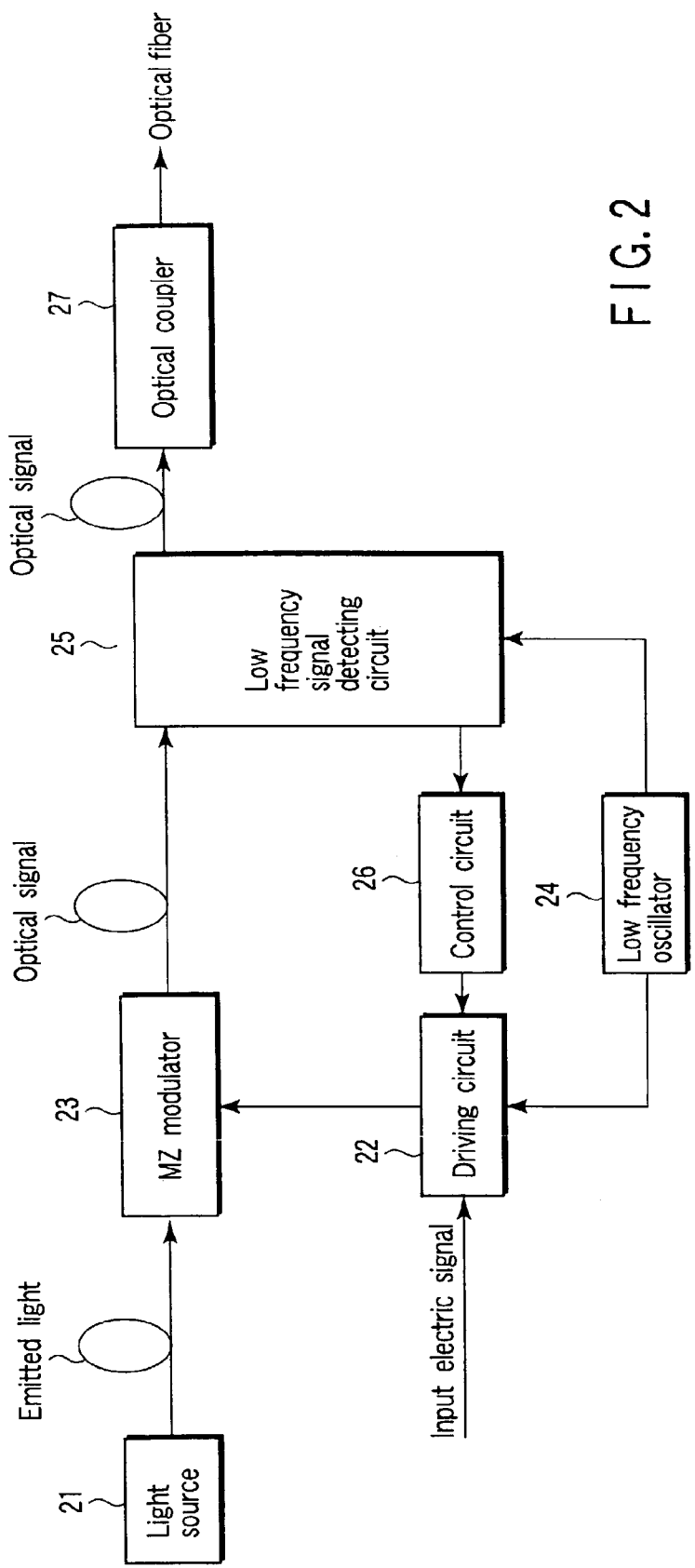
FIG. 2 is a block diagram showing an optical transmitting apparatus using an optical modulating device and used for optical fiber communication according to a first embodiment of the present invention.

FIG. 2 is a block diagram showing an optical transmitting apparatus using an optical modulating device and used for high-speed optical fiber communication according to a first embodiment of the present invention. A circuit section of the optical modulating device is composed of, for example, multi-chip modules formed of a plurality of semiconductor devices.

In FIG. 2, a driving circuit 22 generates a driving voltage varying depending on the amplitude of an input signal (electric signal). An MZ modulator 23 carries out, according to the driving voltage, modulation of intensity of coherent and amplitude-fixed light emitted by a light source 21 composed of, for example, a semiconductor laser. The MZ modulator 23 has a light transmittance such as the one shown in FIG. 1. A low frequency oscillator 24 outputs a low frequency signal of a predetermined frequency lower than that of an input electric signal. For example, when the frequency of the input electric signal is 10 GHz, the low frequency signal is set at about 10 KHz.

A low frequency signal detecting circuit 25 photo-electrically converts an optical output from the MZ modulator 23 into an electric signal in which only a high frequency signal component of the input electric signal is averaged. It then extracts a frequency component of the low frequency signal from the averaged electric signal. Then, the low frequency signal detecting circuit 25 converts the frequency component of the low frequency signal into a DC voltage proportional to the amplitude of this component. It then detects a position (peak position) at which the DC voltage has a peak value. This peak value is an optimum operating point after an operating point drift in the MZ modulator 23.

A control circuit 26 supplies a control signal to the driving circuit 22 to provide such control as allows the MZ modulator 23 to operate at the optimum operating point (new QUAD point) after an operating point drift. In the present embodiment, the low frequency signal provided by the low frequency oscillator 24 is added to the DC bias voltage that determines the operating point of the MZ optical modulator 23. In this case, the average power of optical outputs from the MZ modulator 23 varies depending on the bias voltage. Thus, by adding the low frequency signal to the bias voltage, it is possible to extract the electric signal in which only the high frequency component of the input signal is averaged, from the optical output from the MZ optical modulator 23 and then extract the frequency component of a low frequency signal contained in this electric signal.

Figure 1:
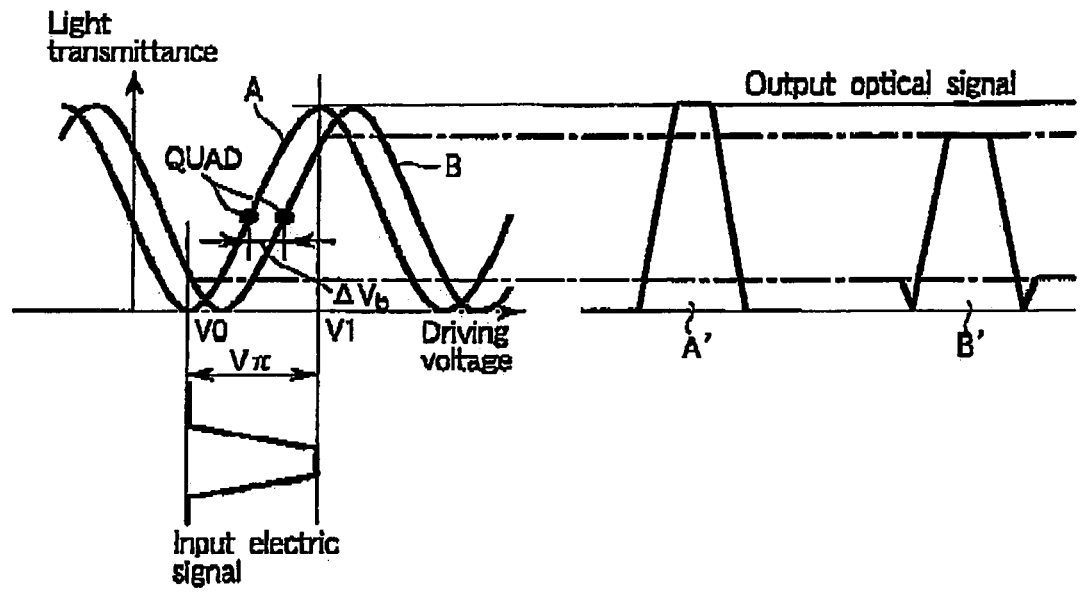
FIG. 1 is a diagram showing an example of the relationship (light transmittance) between an input electric signal and an output optical signal from an MZ type modulator.

Then, the low frequency signal detecting circuit 25 extracts the frequency component of a low frequency signal from the optical output from the MZ optical modulator 23 and multiplies the extracted signal by the low frequency signal outputted by the low frequency oscillator 24. The low frequency signal detecting circuit 25 passes the multiplied signal through a low pass filter to leave behind only the DC voltage. The value of this DC voltage is proportional to the frequency component of the low frequency signal. Further, as shown in FIG. 1, when the operating point coincides with the QUAD point (no operating point drifts are occurring), the amplitude of the frequency component of the low frequency signal has its maximum value. At this time, the DC voltage has its maximum value.

Therefore, a stable optical signal can be transmitted to a high-speed optical fiber from the MZ modulator 23 via an optical coupler 27 by allowing the control circuit 26 to output a control signal to the driving circuit 22 in response to an operating point drift, the control signal varying the bias voltage for the MZ optical modulator 23 so that the modulator 23 operates at the optimum operating point after the operating point drift.

Figure 3:
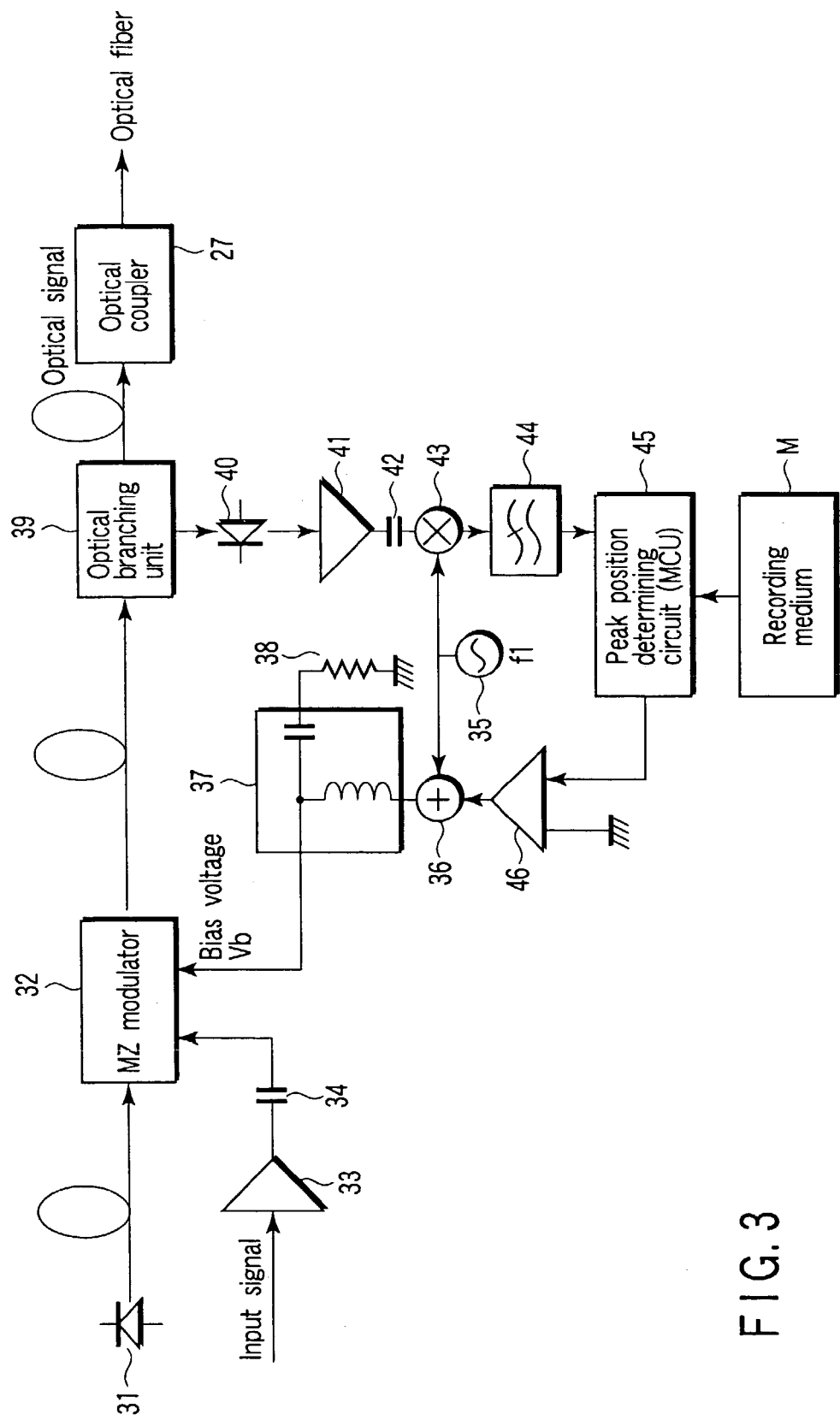
FIG. 3 is a diagram showing a specific example of configuration of the apparatus in FIG. 2.

FIG. 3 shows a specific example of the apparatus in FIG. 2.

In FIG. 3, light emitted by a semiconductor laser as a light source 31 is provided to an MZ modulator 32. For example, an input signal of frequency 10 GHz is inputted to one modulation input terminal of the MZ modulator 32 via a driving amplifier 33 that obtains a predetermined signal level and then via a capacitor 34. A bias T 37 composed of a coil and a capacitor as well as a terminal resistor 38 is connected together in series between the other modulation input terminal of the MZ modulator 32 and a ground node.

On the other hand, a low frequency signal of a predetermined frequency f1 (for example, 10 KHz) outputted by a low frequency oscillator 35 is inputted to one input terminal of an adder 36. An output signal from the adder 36 is inputted to the bias T 37.

The driving amplifier 33, the capacitor 34, the adder 36, the bias T 37, and the terminal resistor 38 correspond to the driving circuit 22 in FIG. 2.

The MZ modulator 32 uses a high frequency signal provided by the driving circuit to modulate the intensity of light emitted by the light source 31. Then, the MZ modulator 32 converts the intensity of light into an optical signal and then outputs this signal. A part of this optical signal is branched by an optical branching circuit 39 and then inputted to a photo-electric conversion photodiode 40. The photodiode 40 then converts the inputted light into an electric signal. The output signal from the photodiode 40 is less responsive to a high frequency component of the input signal such as 10 GHz. Accordingly, the electric signal as the conversion output contains a signal component in which only the high frequency component of the input signal is averaged. On the other hand, the output signal is highly sensitive to a low frequency signal of about 10 KHz. Accordingly, the conversion output signal contains a low frequency signal following a frequency f1 and having an amplitude corresponding to an operating point drift in the MZ modulator 32.

The thus-converted electric signal is inputted to one input terminal of a multiplier 43 via a band amplifier 41 that selectively amplifies a signal component of the output frequency f1 from the low frequency oscillator 35 and then sends it to the multiplier 43 via a capacitor 42. The low frequency signal outputted by the low frequency oscillator 35 is inputted to the other input terminal of the multiplier 43. The two input signals to the multiplier 43 are multiplied together. The multiplied signal is then passed through a low pass filter 44 that allows signals of the frequency f1 or lower to pass through. Consequently, only a DC component is left behind. This DC component is proportional to the amplitude of the frequency component of a low frequency signal contained in the optical output. When the operating point of the MZ modulator 23 coincides with the QUAD point (no operating point drifts are occurring), the amplitude of the frequency component of a low frequency signal has its maximum value. Accordingly, the DC component has its maximum value. Therefore, the optimum operating point can be determined by varying the bias voltage for the MZ modulator 23 and then finding the peak of a variation in the value of the DC voltage.

The bias voltage Vb supplied to the MZ modulator 32 shown in FIG. 3 can be generated by obtaining a voltage signal corresponding to an output of the peak position determining circuit 45 via the bias T 37. On the other hand, when the peak position determining circuit 45 is formed by a micro-control unit (MCU) as will be described later, the digital output from the MCU is converted into an analog voltage signal by a DA converter (not shown) and the analog voltage signal is then supplied to the bias T 37 via an operational amplifier to obtain a bias voltage Vb.

The optical branching circuit 39, the photodiode 40, the band amplifier 41, the capacitor 42, the multiplier 43, and the low pass filter 44 correspond to the low frequency signal detecting circuit 25 in FIG. 2.

An output signal from the low frequency signal detecting circuit 25 is controlled by a peak position determining circuit 45 used to determine a value for a peak position using a trial and error method or the like, described later. The output signal is thus converted into a control voltage. The control voltage is then inputted to one input terminal of a differential amplifier 46. The other input terminal of the differential amplifier 46 is connected to a ground node. An output from the differential amplifier 46 is inputted to the other input terminal of the adder 36. The peak position determining circuit 45 and the differential amplifier 46 correspond to the control circuit 26 in FIG. 2.

The peak position determining circuit 45 can be implemented using, for example, a digital circuit such as the MCU. Specifically, it can be easily implemented using a programmable micro-control unit having a memory. This will be described later in detail with reference to a flow chart shown in FIG. 7.

Figure 4:
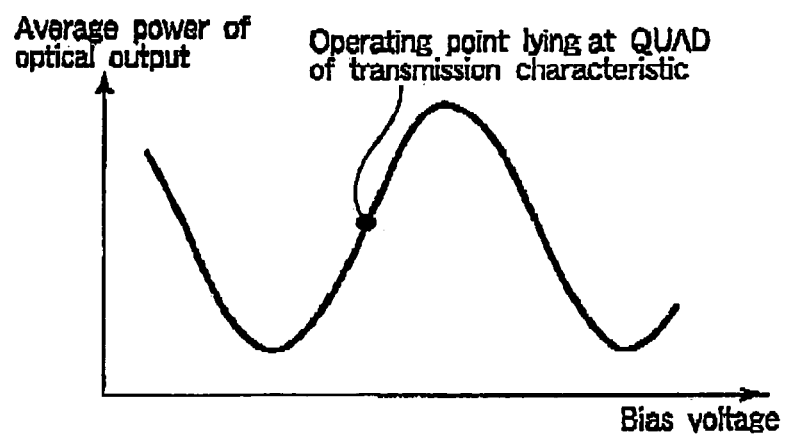
FIG. 4 is a diagram showing the dependence on a bias voltage of the average power of optical signals outputted by an MZ modulator in FIG. 2.

FIG. 4 is a diagram showing the dependence on the bias voltage of the average power of output signals outputted by the MZ modulator 32 in FIGS. 2 and 3.

As shown in FIG. 4, by varying the bias voltage, which determines the operating point of the MZ modulator 32, the average power of optical outputs from the MZ modulator 32 varies periodically. When the operating point of the MZ modulator 32 coincides with the QUAD point, the average power of optical outputs from the MZ modulator 32 is halfway between the maximum and minimum values. Furthermore, the bias voltage for the MZ modulator 32 is halfway between the one obtained at the maximum average power of optical outputs and the one obtained at the minimum bias voltage.

FIG. 4 shows the average power. Even when the average power of optical outputs has a different absolute value, if the difference between the driving voltages V0 and V1 does not equal $V\pi$, the positional relationship in the graph is not affected.

Figure 5:
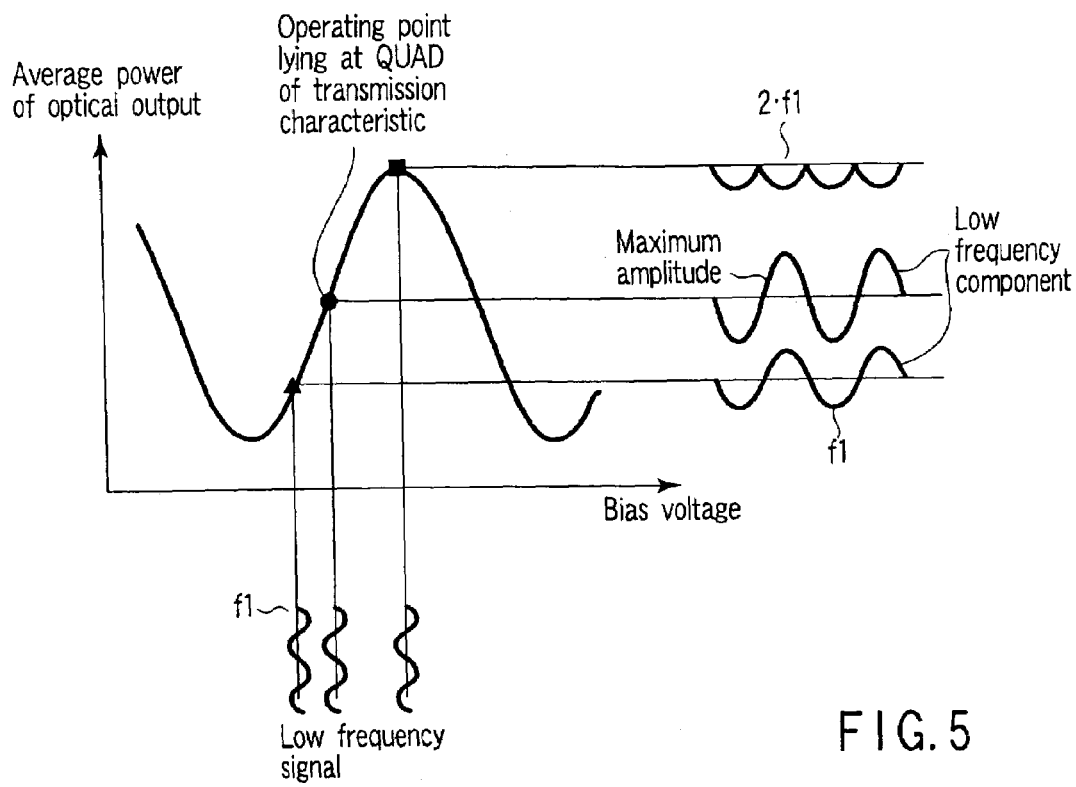
FIG. 5 is a diagram showing frequency components of a low frequency signal extracted from an optical output, the diagram illustrating operations performed by a low frequency signal detecting circuit and a control circuit in FIG. 2.

FIG. 5 illustrates operations performed by the low frequency detecting circuit 25 and control circuit 26 in FIG. 2.

A low frequency signal is added to the bias voltage for the MZ optical-modulator 23. Then, an optical output from the MZ modulator 23 is inputted to the low frequency signal detecting circuit 25. The low frequency signal detecting circuit 25 converts the optical output into an electric signal in which only a high frequency component of an input signal is averaged. Then, a frequency component of a low frequency signal is extracted from the averaged electric signal.

When the bias voltage is at the QUAD point, the amplitude of the frequency component of a low frequency signal has its maximum value. Further, if the operating point drifts by half $V\pi$, it is located at the peak point of average power of optical outputs. The frequency component of a low frequency signal has a frequency $2 \cdot f1$, which is double the frequency f1.

Figure 6:
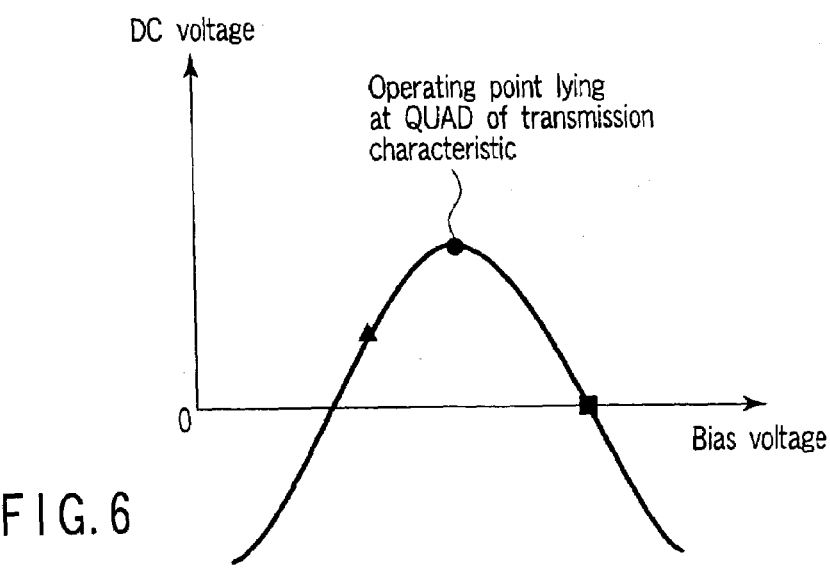
FIG. 6 is a diagram showing a result of multiplication of a DC voltage by a low frequency signal, the diagram illustrating operations of the circuit in FIG. 3.

FIG. 6 is a characteristic diagram illustrating operations of the circuit in FIG. 3.

The multiplier 43 multiplies a frequency component of a low frequency signal outputted by the band amplifier 41 and capacitor 42, by a low frequency signal outputted by the low frequency oscillator 35. Then, a DC voltage proportional to the frequency component of a low frequency signal is extracted through the low pass filter 44.

If no operating point drifts are occurring, the bias voltage is at the QUAD point. The amplitude of frequency component f1 of the low frequency signal has its maximum value, so that the DC voltage has its peak value. On the other hand, if the operating point drifts by half $V\pi$, the DC voltage is zero because the frequency component f1 is not present.

Accordingly, the optimum operating point after an operating point drift can be found using the peak position determining circuit 45, which detects the position at which the DC voltage has its peak value. As can be seen in the characteristic diagram shown in FIG. 6, the right and left sides of the peak position are symmetrical. The first operation of the peak position determining circuit 45 is performed in a trial and error manner. That is, since the operating point at that time is unknown, it is unknown whether to move the operating point in the direction in which the bias voltage is increased or reduced. There is no other choice but to try moving the operating point in either direction. This operation can be more easily performed by constructing the peak position determining circuit 45 using a programmable micro-control unit (MCU) having a memory. This will be described later.

By constructing the circuit 45 for detecting the peak position in FIG. 3, using a programmable micro-control unit (MCU) having a memory, a required peak position detecting function can be realized according to the flow chart shown in FIG. 7.

When the circuit 45 is configured with an MCU, a peak position determining program stored in an externally recording medium M is written into an internal memory provided in the MCU 45 as shown in FIG. 3. Further, predetermined data representing constants necessary to determine the peak position is also stored in the recording medium M and the stored data is written into the internal memory.

In the first step S1 of FIG. 7, a bias voltage is initialized as 0 V.

Then, in step S2, an output voltage from the low pass filter 44 as an output of the synchronous detection circuit is measured and which is stored in the internal memory of the MCU 45 as a first error output voltage Ver1.

Then, in step S3, the bias voltage Vb is shifted by $+\Delta Vb$ to supply to the MZ modulator 32 the bias voltage (Vb+$\Delta Vb$), by way of trial.

Next, in step S4, an output voltage from the low pass filter 44 is measured again. The measured value is stored in the internal memory of the MCU 45 as a second error voltage Ver2.

A difference value $\Delta Ver$ between the two error output voltages Ver1 and Ver2 is obtained in the step S5 and the process goes to next step S6 in which determination is performed as to whether or not the absolute value of the difference value $\Delta Ver$ is larger than the tolerance value $\epsilon$ set in the MCU 45.

The fact that the difference value $\Delta Ver$ is larger than the tolerance value $\epsilon$ represents that the operation point resides at a point at which the inclination of the bias curve is large. If YES is obtained in the step S6, the operation goes to step S7 where the determination whether the sign of the difference value $\Delta Ver$ is plus or minus is made.

If the value is plus ($\Delta Ver>0$), it is known that the operation point resides at some point on the bias curve of the plus inclination and the operation goes to step S8 in which the bias voltage Vb is further shifted by $+\Delta Vb$ in the plus direction to supply the voltage (Vb+$\Delta Vb$) to the MZ modulator 32.

Then, the value Ver1 is not measured again but the measured value stored in the MCU 45 is read out from the internal memory of the MCU 45 and the read data is stored in the internal memory as the measured value Ver1 in step S9.

In the next step S10, an output from the low pass filter 44 is measured and stored in the internal memory as a value Ver2.

A difference value $\Delta Ver$ between the two error output voltages Ver1 and Ver2 thus obtained is calculated at step S11 which is followed by step S12 in which determination whether or not an absolute value of the difference ΔVer is larger than the tolerance value ε set in the MCU 45 is executed.

If YES is obtained, the operating point still resides on the bias curve having a large inclination, and the operations from step S8 to S12 are repeatedly executed. When the absolute value of the difference ΔVer becomes less than ε, NO is obtained in the step S12 and the repeated operation is terminated.

When NO is obtained in the step S7, the operation point is detected at a point on the bias curve having a negative inclination and the process goes to step S13 where the bias voltage is shifted by ΔVb in the inverse direction to supply to the MZ modulator 32 a bias voltage (Vb−ΔVb).

Then, the value Ver1 is not measured again but the measured value Ver2 stored in the internal memory of the MCU 45 is read out. The read data is stored in the internal memory as the measured value Ver1 in step S14.

In the next step S15, an output of the low pass filter 44 is measured and the measured data is stored in the internal memory as the measured value Ver2.

A difference value ΔVer between the two error output voltages Ver1 and Ver2 thus obtained is calculated at step S16 which is followed by step S17 in which determination whether or not an absolute value of the difference ΔVer is larger than the tolerance error value ε set in the MCU 45 is executed.

If YES is obtained, the operating point still resides on the bias curve having a large inclination, and the operations from step S13 to S17 are repeatedly executed. When the absolute value of the difference ΔVer becomes less than ε, NO is obtained in the step S17 and the repeated operation is terminated.

Further, if an absolute value of ΔVer less than the tolerance error value ε is obtained in the step S6, it can be noted that the operation point resides at around the peak position. Then, the process shifts to step S18 where the control is stopped for a predetermined interval of time T1 (seconds). After T1 seconds are lapsed, the process flow restarts from the step S2.

This operation is performed similarly in a case where NO is obtained in the step S12 or in step S17.

With the optical modulating device, the optical transmitting apparatus using this optical modulating device, and the method of modulating an optical modulator according to the first embodiment, the MZ type optical modulator 32 is provided with a driving signal corresponding to an input signal that is a binary digital signal as well as a DC bias voltage on which a low frequency signal is superposed, to modulate input light according to the driving voltage to convert the input signal into an optical signal. Then, an optical signal outputted by the MZ optical modulator 32 is converted into an electric signal in which only a high frequency component of the input signal is averaged. A frequency component of a low frequency signal is extracted from the averaged electric signal and then multiplied by a low frequency signal superposed on the DC bias voltage. Then, a DC component is extracted from the multiplied signal. The DC bias voltage can then be controlled to its optimum value so as to maximize this DC component.

Thus, even if an operating point drift occurs in the MZ type modulator 32 because of the DC bias voltage applied to the MZ type optical modulator 32, temperature, aging, or the like, it can be compensated to control the MZ modulator 32 to operate at the optimum operating point. It is thus possible to prevent degradation of the optical extinction ratio of an output optical signal from the modulator 32 whose degradation is associated with the operating point drift. This configuration does not require an expensive variable gain amplifier having a wide dynamic range and used to modulate its input signal, and can thus be simplified and miniaturized. This configuration can compensate for an operating point drift in the MZ type optical modulator 32 whether or not the difference between the driving voltages V0 and V1 for the MZ type optical modulator 32 equals Vπ.

SECOND EMBODIMENT

Figure 8:
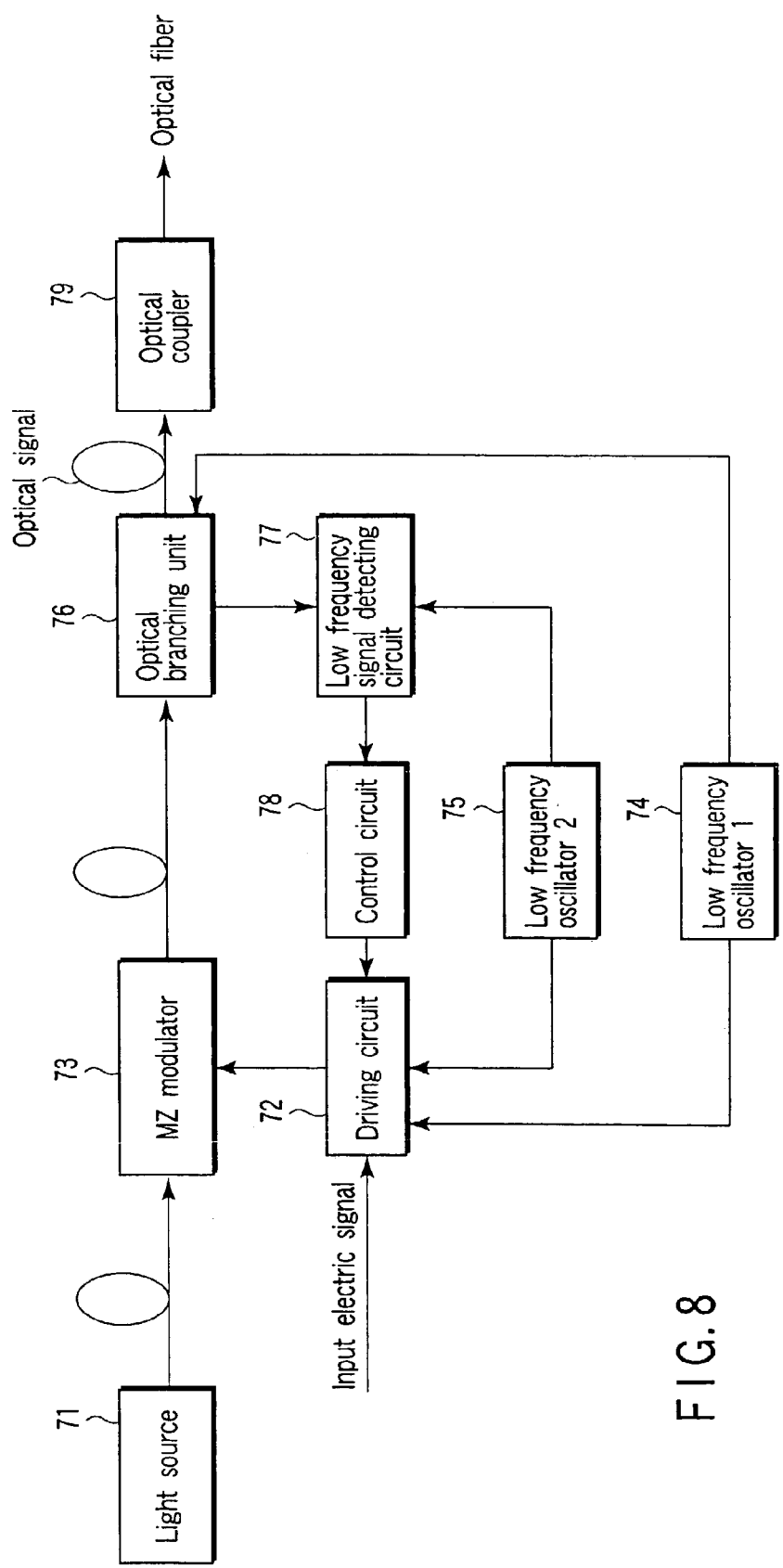
FIG. 8 is a block diagram showing an optical transmitting apparatus for optical fiber communication according to a second embodiment of the present invention.

FIG. 8 is a block diagram showing an optical transmitting apparatus for optical fiber communication according to a second embodiment of the present invention.

An optical transmitting apparatus according to the second embodiment is obtained by improving the optical transmitting apparatus according to the first embodiment, which requires a trial and error operation to detect the peak position at which the DC voltage extracted by the low frequency detecting circuit 25 has its peak value. The optical transmitting apparatus according to the second embodiment enables the direction of the operating point drift to be determined without any trial and error operations.

The optical transmitting apparatus in FIG. 8 has the same configuration as the optical transmitting apparatus previously described with reference to FIG. 2 except that:

(1) a first low frequency oscillator 74 with an output frequency f1 of, for example, 10 KHz and a second low frequency oscillator 75 with an output frequency f2 of, for example, 7 KHz are provided in place of the low frequency oscillator 23 in FIG. 2, and (2) an optical branching unit 76 acting as a first low frequency signal detecting circuit is provided in place of the low frequency signal detecting circuit 25 in FIG. 2, and a second low frequency signal detecting circuit 77 is further provided. The same arrangements of these embodiments are denoted with the same names but different reference numerals.

That is, in FIG. 8, reference numeral 71 denotes a light source and 72 denotes a driving circuit that generates a driving voltage corresponding to an input electric signal. Reference numeral 73 denotes an MZ modulator that modulates light emitted by the light source 71 according to the driving voltage to convert the input signal into an optical signal and that supplies the optical signal from an optical coupler 79 to an optical fiber. Reference numerals 74 and 75 denote a first low frequency oscillator and a second low frequency oscillator that output a signal of the first low frequency f1 and a signal of the second low frequency f2, respectively, the first and second low frequency both being sufficiently lower than that of the input electric signal and being different from each other. In the present example, the output frequency f2 of the second low frequency oscillator 75 is slightly higher than half of the output frequency f1 of the first low frequency oscillator 74.

Reference numeral 76 functions as an optical branching unit as well as a first low frequency signal detecting circuit which converts an optical signal outputted by the MZ converter 73, into an element signal in which a high frequency component of the input signal is averaged, extracts the frequency components f1 and f2 of the first and second low frequency signals from the averaged electric signal, multiplies the frequency components f1 and f2 by the first low frequency signal outputted by the first low frequency oscillator 74, and extracts a DC component of the multiplied output signal and a frequency component of the second low frequency signal. A part of the output from the MZ modulator 73 passes through the unit 76 functions as an optical branching circuit as it is. This part is then sent from the optical coupler 79 to the optical fiber.

Reference numeral 77 denotes a second low frequency signal detecting circuit that detects the frequency component of the second low frequency signal contained in the signal outputted by the first low frequency signal detecting circuit, and compares the phase of this frequency component with that of the second low frequency signal outputted by the second low frequency oscillator 75 to detect the direction of an operating point drift in the MZ modulator 73.

Reference numeral 78 denotes a control circuit that outputs a control signal to the driving circuit 72 in response to an operating point drift in the MZ modulator 73, the control signal serving to control the operating point of the MZ modulator 73 to the same direction of the drift.

In the present embodiment, the driving circuit 72 receives not only the first low frequency f1 signal from the first low frequency oscillator 74 but also the second low frequency f2 signal from the oscillator 75 which is lower than the first low frequency f1 signal. As in the case with the first embodiment, the average power of optical outputs from the MZ modulator 73 varies depending on the bias voltage. Thus, by adding the first and second low frequency signals to the bias voltage, it is possible to extract, from the optical output from the MZ optical modulator 73, the electric signal in which only the high frequency component of the input signal is averaged and then extract the frequency component of a low frequency signal.

As in the case with the first embodiment, the first low frequency signal detecting circuit included in the optical branching unit 76 extracts the frequency component of a low frequency signal from the optical output from the MZ modulator 73 and then converts the frequency component of the first low frequency f1 signal into a DC voltage. However, the signal of the second low frequency f2, which is lower than the first low frequency, is left behind as it is.

The second low frequency signal detecting circuit 77 detects the thus left behind frequency component of the second frequency signal. It then compares the phase of this frequency component with that of the second low frequency signal outputted by the second low frequency oscillator 75 to detect the direction of the operating point drift. In the present embodiment, the control circuit 78 supplies a control signal to the driving circuit 72, the control signal serving to provide such control as varies the driving voltage in the same direction as that of the operating point drift.

Figure 9:
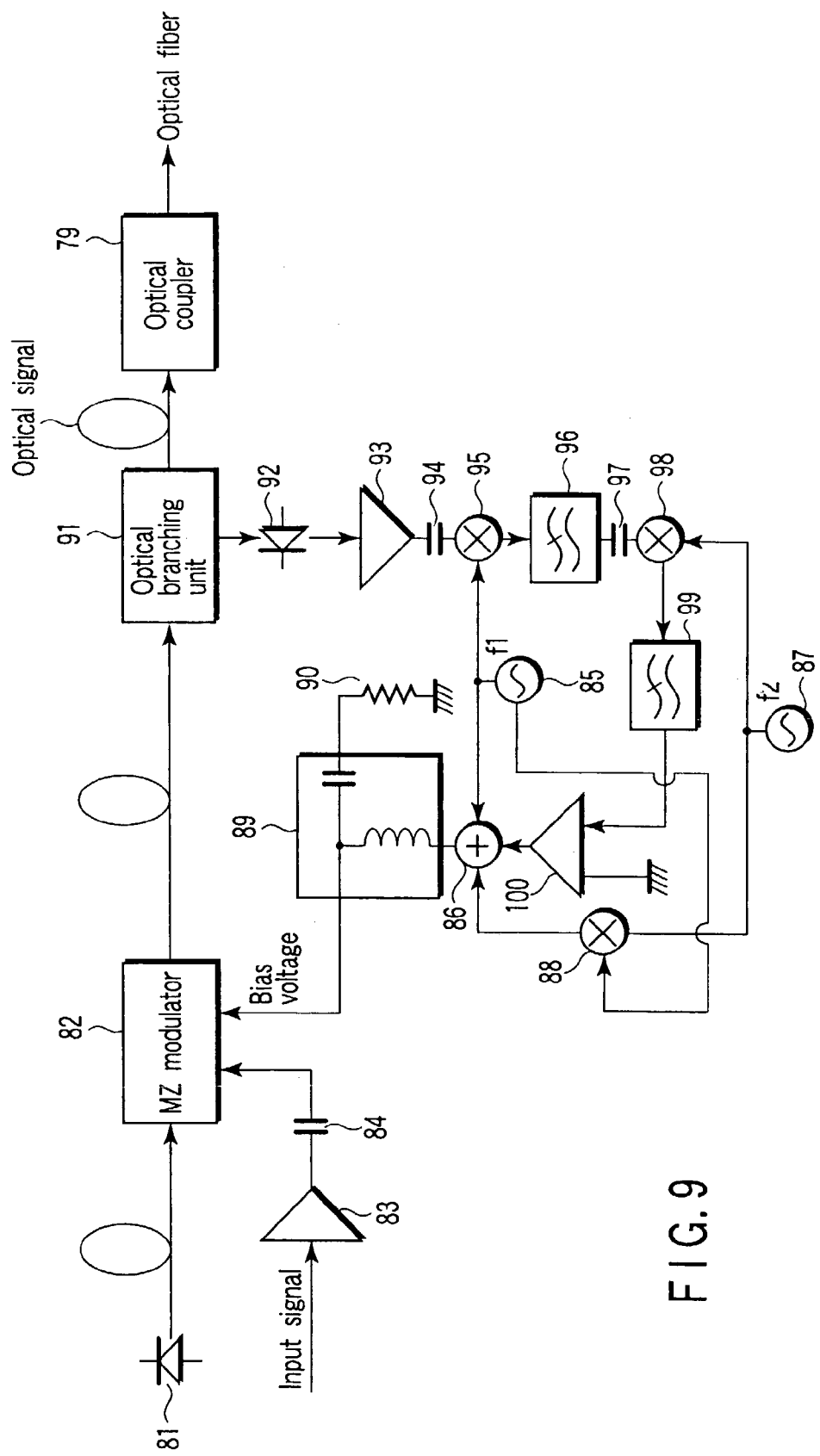
FIG. 9 is a diagram showing a specific example of configuration of the apparatus in FIG. 8.

FIG. 9 shows a specific example of configuration of the apparatus in FIG. 8.

In FIG. 9, reference numerals 79, 81, and 82 denote an optical coupler, a semiconductor laser as a light source, and an MZ modulator, respectively. Reference numerals 83, 84, and 85 denote a driving amplifier, a capacitor, and a first low frequency oscillator. Reference numerals 86, 87, and 88 denote an adder, a second low frequency oscillator, and a third multiplier. Reference numerals 89, 90, and 91 denote a bias T, a terminal resistor, and an optical branching unit. Reference numerals 92, 93, and 94 denote a photodiode, a band amplifier, and a capacitor. Reference numerals 95, 96, and 97 denote a first multiplier, a first low pass filter, and a capacitor. Reference numerals 98, 99, and 100 denote a second multiplier, a second low pass filter, and a differential amplifier.

The optical transmitting apparatus shown in FIG. 9 is the same as the optical transmitting apparatus previously described with reference to FIG. 3 except for the points (1) and (2) below. The same parts of these apparatuses are denoted by the same names but different reference numerals.

(1) The peak position determining circuit 45 is omitted. The second low frequency oscillator 87, third multiplier 88, capacitor 97, second multiplier 98, and second low pass filter 99 are added. The adder 86 with three input terminals is used in place of the adder 36.

Low frequency signals of the predetermined frequencies f1 and f2 outputted by the first low frequency oscillator 85 and the second low frequency oscillator 87, respectively, are inputted to corresponding input terminals of the third multiplier 88. A multiplied output signal from the third multiplier 88 is inputted to one of input terminals (additional input terminal) of the adder 86.

(2) The band amplifier 93 selectively amplifies a frequency band from a frequency (f1–f2) to the frequency f1. The first low pass filter 96 passes signals of the frequency lower than f1. The second low pass filter 99 passes signals of the frequency lower than f2.

In FIG. 9, the optical branching unit 91, the photodiode 92, the band amplifier 93, the capacitor 94, the first multiplier 95, and the first low pass filter 96 correspond to the first low frequency signal detecting circuit 76. Further, the capacitor 97, the second multiplier 98, and the second low pass filter 99 correspond to the second low frequency signal detecting circuit 77 in FIG. 8.

Operations of the optical transmitting apparatus in FIG. 9 are basically the same as those of the optical transmitting apparatus in FIG. 3 according to the previously described first embodiment.

That is, an optical signal outputted by the MZ modulator 82 contains frequency components of low frequency signals (f1, f1–f2, f1+f2). The frequency components f1–f2 and f1+f2 are generated by multiplying a low frequency signal of the frequency f1 by a low frequency signal of the frequency f2.

After the optical signal has been outputted by the MZ modulator 82, a part of an optical output is branched and extracted by the optical branching circuit 91 while others are sent via the optical coupler 79 to the optical fiber. This part is then inputted to the photodiode 92. The photodiode 92 then converts it into an electric signal. The band amplifier 93 then selectively amplifies the electric signal obtained over the frequency band from f1–f2 to f1 and then inputs the amplified signal to one input terminal of the first multiplier 95 via the capacitor 94. A low frequency signal of the frequency f1 outputted by the first low frequency oscillator 85 is inputted to the other input terminal of the first multiplier 95.

A multiplied output signal from the first multiplier 95 passes through the first low pass filter 96. Then, only the DC voltage and the low frequency component of the frequency f2 are left behind. In this case, as previously described, since the frequency f2 is slightly lower than the frequency f1, the frequency component f1–f2 has a period several times longer than that of the frequency component f1. Accordingly, the frequency component f1–f2 is negligible, and the first multiplier 95 operates as shown in FIG. 5.

An output signal from the first low pass filter 96 is inputted to one input terminal of the second multiplier 98 via the capacitor 97. An output signal from the second low frequency oscillator 87 is inputted to the other input terminal of the second multiplier 98. The second multiplier 98 outputs a signal corresponding to a difference in phase between these two input signals. This output signal is inputted to one input terminal of the differential amplifier 100 via the second low pass filter 99, which allows signals of the predetermined frequency f2 and lower to pass through.

Figure 10:
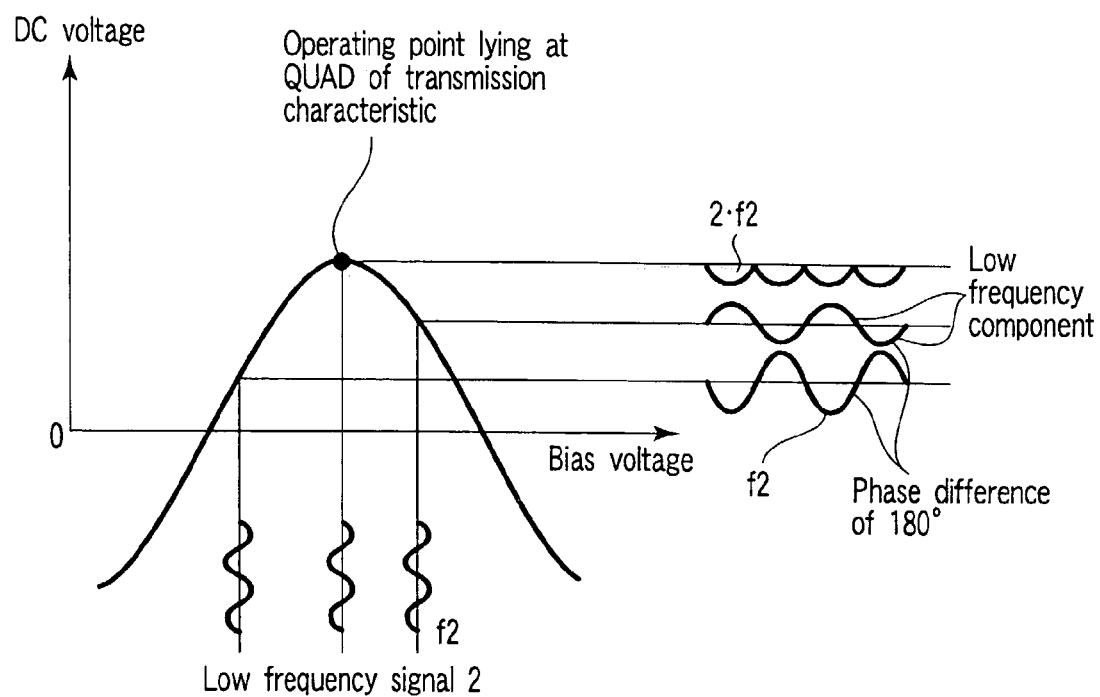
FIG. 10 is a diagram showing frequency components of a second low frequency signal left with a DC voltage and detected by a first low frequency signal detecting circuit, the diagram illustrating operations performed by the circuit in FIG. 9.

FIG. 10 illustrates operations performed by the circuit in FIG. 9.

As shown in FIG. 10, when the bias voltage is at the QUAD point, the operating point coincides with the peak point of the DC voltage. At this time, the low frequency component left behind in the output from the first low pass filter 96 together with the DC voltage has a frequency 2·f2, which is double the frequency f2.

Accordingly, this frequency component is zeroed by multiplying the output signal from the first low pass filter 96 by the output signal from the second low frequency oscillator 87 and passing the multiplied signal through the second low pass filter 99.

In fact, if the frequency f2 is set to be higher than half of the frequency f1, as previously described, when no operating point drifts are occurring, the components f1 and f2 are zeroed when outputted by the second low pass filter 99 because the component of a frequency double the frequency f2 does not even pass through the first low pass filter 96 (The first low pass filter 96 allows only signals with frequency lower than f1 pass through it.).

On the other hand, if any operating point drift occurs, the phase of the low frequency f2 component left behind in the output from the first low pass filter 96 differs from the phase of the low frequency signal outputted by the second low frequency oscillator 87 by 180°, depending on the direction of the operating point drift. Consequently, the output from the second low pass filter 99 is the signal corresponding to the difference in phase between the frequency f2 component and the low frequency signal outputted by the second low frequency oscillator 87.

The differential amplifier 100, to which the signal corresponding to the operating point drift is inputted, controls the voltage inputted to the adder 86 and thus the bias voltage inputted to the MZ modulator 82. The differential amplifier 100 thus maintains the optimum operating point of the MZ modulator by compensating for the operating point drift.

The multiplied output signal from the multiplier 88 is added to the adder 86 for the reason described below.

One input signal to the first multiplier 95 is the low frequency signal within the frequency band from f1−f2 to f1, selected by the band amplifier 93. The frequency fin of this signal equals (f1 and f1−f2). The other input signal to the first multiplier 95 has the frequency f1. Thus, the frequency fout1 of the multiplied output signal from the first multiplier 95 equals f1−fin and f1+fin.

In this case, f1−fin is expressed as follows:

$$f1-f1=0 \quad (1)$$

$$f1-(f1-f2)=f2 \quad (2)$$

f1+fin is expressed as follows:

$$f1+f1=2f1 \quad (3)$$

$$f1+(f1-f2)=2f1-f2 \quad (4)$$

Then, the multiplied output signal from the first multiplier 95 passes through the first low pass filter 96, so that only the DC voltage and the low frequency signal component of the frequency f2 are obtained.

To accomplish the above-described operation, the frequency fin of one input signal to the first multiplier 95 must equal the low frequencies (f1 and f1−f2) within the frequency band from f1−f2 to f1, selected by the band amplifier 93. Thus, the multiplied output signal (a frequency fout3 equals f1−f2 and f1+f2) from the third multiplier 88 is added to the adder 86. Further, the band amplifier 93 selects the low frequency signal within the frequency band from f1−f2 to f1, included in the frequency components (f1, f1−f2, f1+f2) of low frequency signals in optical signals outputted by the MZ modulator 82.

THIRD EMBODIMENT

Figure 11:
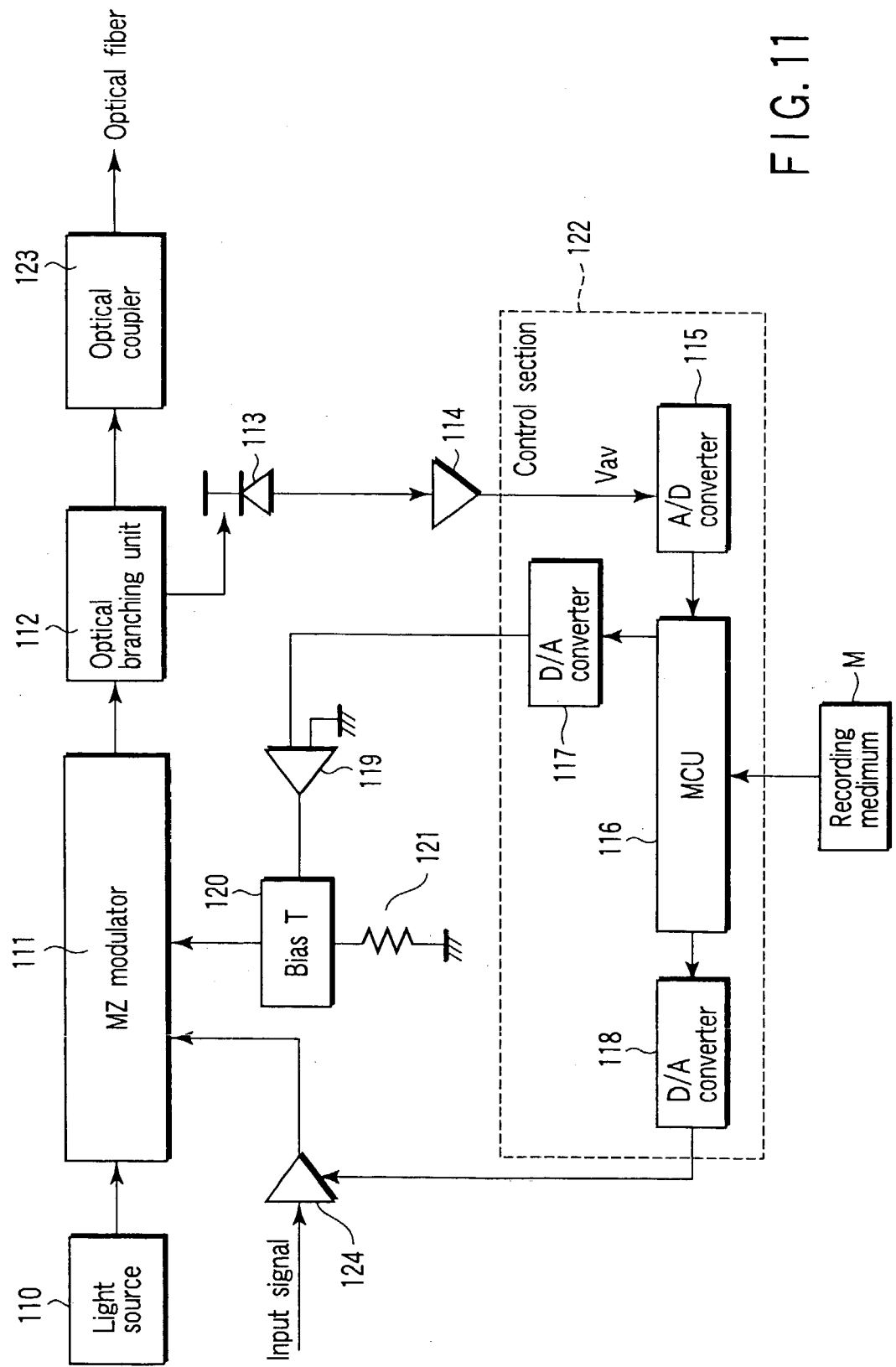
FIG. 11 is a block diagram showing an optical transmitting apparatus for optical fiber communication according to a third embodiment of the present invention.

FIG. 11 is a block diagram showing an optical transmitting apparatus for optical fiber communication according to a third embodiment of the present invention.

In FIG. 11, light emitted by a semiconductor laser 110 as a light source is inputted to an MZ type modulator 111 that is an external modulator. On the other hand, an input signal is amplified by an output variable amplifier 121 that can vary the amplitude Vpp of an output voltage according to a control input. The MZ type modulator 111 modulates output light from the semiconductor laser 110 according to an output voltage from the output variable amplifier 121.

Output light from the MZ type modulator 111 is branched by an optical branching unit 112. One of the branched signals is outputted to an optical fiber via an optical coupler 123 as an optical signal. The other branched signal is inputted to a photodiode 113 used to monitor optical signals. The photodiode 113 converts the inputted optical signal into a current proportional to optical power. A current/voltage converting amplifier 114 converts the output current from the photodiode 113 into a voltage to output an optical output monitor voltage Vav. The photodiode 113 and the current/voltage converting amplifier 114 detect the time average value Pav of optical output power from the MZ type modulator 111. It is thus unnecessary to have a quick response characteristic, which tends to incur high costs.

The output voltage Vav from the current/voltage converting amplifier 114 is sent to a control section 122. The control section 122 is composed of an MCU (micro-control unit) 116, an A/D converter 115, and D/A converters 117 and 118. It uses the A/D converter 115 to convert the inputted voltage value Vav into a digital signal and then, for example, stores this signal in a memory area contained in the MCU 116. Program data and data representing constants used in the MCU 116 may be supplied to the MCU 116 from an external recording medium M as in the case of FIG. 3.

Further, the control section 122 generates a Vpp control signal serving to control the output amplitude of the output variable amplifier 121. It then causes the D/A converter 118 to convert the Vpp control signal into, for example, an analog signal of frequency 500 Hz or lower and then supplies this signal to the output varying amplifier 121. Furthermore, the control section 122 generates a bias control signal on the basis of the voltage Vav. It then uses the D/A converter 117 to convert this control signal into an analog signal and then dispatches the converted signal to a differential amplifier 119. The bias control signal is then amplified by the differential amplifier 119. The amplified signal is applied to the MZ modulator 111 via a bias circuit 120 as a DC bias voltage Vb.

FIG. 12 is a characteristic diagram showing the relationship between an input signal and a corresponding output optical signal observed if the amplitude of the driving voltage for the MZ type modulator 111, shown in 11, is varied.

FIG. 13 is a characteristic diagram showing the relationship between the DC bias voltage Vb for the MZ type modulator 111, shown in FIG. 11, and the difference in average power output from the MZ type modulator 111.

With reference to FIGS. 12 and 13, description will be given of the operational principle of method of controlling the MZ type modulator 111, shown in FIG. 11.

In FIG. 12, reference characters A and A' denote a driving voltage waveform and an output optical signal waveform observed if the output amplitude Vpp of the output variable amplifier 121 equals $V\pi$. Reference characters B and B' denote an input voltage waveform and an output optical signal waveform observed if the output amplitude Vpp of the output variable amplifier 121 is increased by a trace amount $\Delta V$ ($\Delta V>0$) from $V\pi$.

Further, the time average value of output optical signal power obtained when the amplitude Vpp of the driving voltage for the MZ type modulator 111 is $V\pi$ is defined as Pav1. The time average value of output optical signal power obtained when Vpp is set at $V\pi+\Delta V$ is defined as Pav2. The difference (Pav2−Pav1) is defined as $\Delta$Pav.

In FIG. 13, a bias voltage Vbopt resulting in the difference in average power $\Delta$Pav=0 is obtained if the optical transmission characteristic of the MZ type modulator 111 has the optimum relationship with the input signal to the optical modulator. The bias voltage Vbopt equals the QUAD voltage Vquad.

If a DC drift occurs in the MZ type modulator 111 to shift the optical transmission characteristic of the MZ type modulator 111 leftward (negative direction) from its initial optimum state to lay the Vb at a more positive position with respect to the Vquad, then $\Delta$Pav<0. By contrast, if the optical transmission characteristic of the MZ type modulator 111 shifts rightward (positive direction) from its initial optimum state to lay the Vb at a more negative position with respect to the Vquad, then $\Delta$Pav>0.

Consequently, the bias voltage Vb can be made equal to its optimum value Vquad by detecting the difference in average power $\Delta$Pav before and after a change in Vpp and controlling the bias voltage Vb so as to zero the difference.

Figure 14:
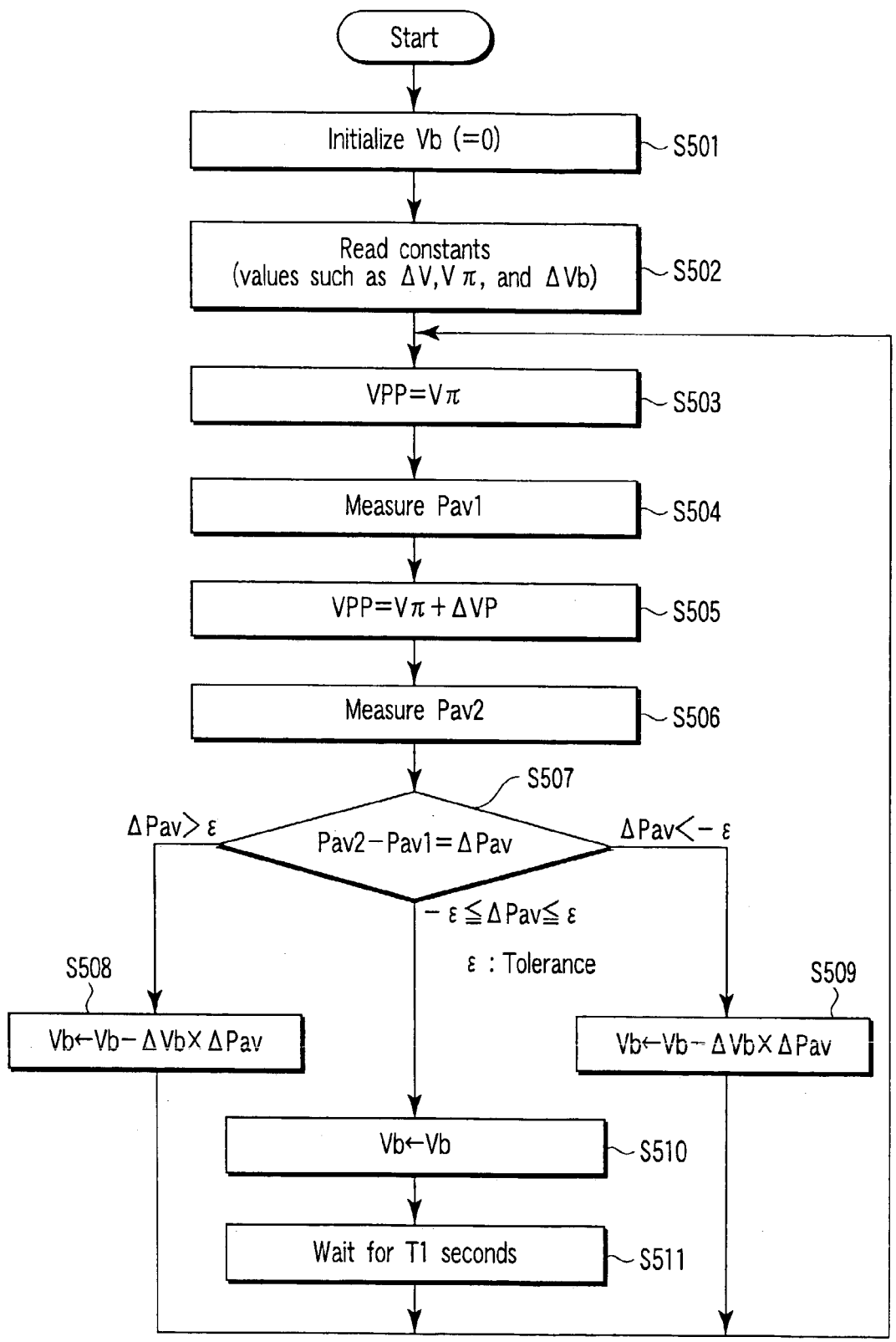
FIG. 14 is a flow chart showing an example of a control procedure executed by a control circuit of an optical modulating device in FIG. 11.

FIG. 14 is a flow chart showing an example of a control procedure executed by the MCU 116 of the control section 122, shown in FIG. 11. This control is implemented by writing a control program recorded on the recording medium M according to the present embodiment, in, for example, an internal memory in the micro-control unit MCU 116 and allowing the micro-control unit MCU 116 to operate on the basis of this control program.

Now, the example of the control procedure will be described with reference to FIGS. 11 and 14.

(1) At a first step S501, the bias voltage Vb is initialized to 0V.

(2) At a second step S502, constants such as $\Delta V$, $V\pi$, and $\Delta Vb$ which are required for control are read from the external memory or the recording medium M.

(3) At a third step S503, the output amplitude Vpp of the output variable amplifier 121 is set at $V\pi$.

(4) At a fourth step S504, the time average value (actually the voltage value Vav) of optical output power is referenced and stored as Pav1 in the memory area of the internal memory contained in the MCU 116.

(5) At a fifth step S505, the output amplitude Vpp of the output variable amplifier 121 is set at $V\pi+\Delta V$.

(6) At a sixth step S506, the time average value (actually the voltage value Vav) of optical output power is referenced and stored as Pav2 in the memory area contained in the MCU 116.

(7) At a seventh step S507, the value $\Delta$Pav=Pav2 −Pav1 is calculated. The operation is branched according to this value (condition).

(8-1) When the $\Delta$Pav is larger than a tolerance $\epsilon$ (positive value), the Vb is increased and set at Vb+$\Delta$Vb×$\Delta$Pav (an eighth step S508). In this case, $\Delta$Vb>0. That is, the Vb is more sharply increased as the $\Delta$Pav increases.

(8-2) When the $\Delta$Pav is smaller than a tolerance $-\epsilon$, the Vb is reduced and set at Vb−$\Delta$Vb×$\times$Pav (an eighth step S509). That is, the Vb is more sharply reduced as the $\Delta$Pav increases.

(8-3) When the $\Delta$Pav is equal to or smaller than $\epsilon$ and is equal to or larger than $-\epsilon$, the Vb is considered to be at the optimum operating point. The bias voltage value is not changed (an eighth step S510). The control is caused to stand by (wait) for T1 seconds (a ninth step S511).

(9) The procedure returns to the third step S503 to repeat the control in steps (3) to (8).

The above control procedure enables the optimum operations to be always maintained even if the light transmittance of the MZ type modulator 111 changes owing to a change in ambient temperature or aging.

That is, with the optical modulating device, the optical transmitting apparatus using this optical modulating device, and the method of modulating an optical modulator according to the third embodiment, the MZ type optical modulator 111 is provided with a driving signal corresponding to an input signal that is a binary digital signal as well as a DC bias voltage to modulate input light according to the driving voltage to convert the input signal into an optical signal. Then, the DC bias voltage is controlled on the basis of a difference between the optical signal output average power of the optical modulator detected before a binary change in the amplitude of the input signal and the optical signal output average power of the optical modulator detected after the binary change.

Thus, if an operating point drift occurs in the MZ type modulator 111 because of the DC bias voltage applied to the MZ type optical modulator 111, the environment temperature, aging, or the like, it can be compensated to control the MZ type modulator 111 to operate at the optimum operating point. It is thus possible to prevent degradation of the optical extinction ratio of an output optical signal from the modulator whose degradation is associated with the operating point drift.

In this case, the output variable amplifier 121 can binarily change the amplitude of its output signal, for example, simply by slightly changing the magnitude of a driving current. It is thus unnecessary to have an expensive variable gain amplifier having a wide dynamic range and used to modulate the amplitude of its input signal using a sinusoidal wave as in the conventional example. This allows the circuit configuration to be simplified and miniaturized. Moreover, synchronous detection is not required, thus further simplifying the circuit configuration. This serves to reduce the number of parts required, thus facilitating size and cost reduction.

Further, the operating point drift in the MZ type optical modulator 111 can be compensated whether or not the difference between the driving voltages V0 and V1 for the MZ type optical modulator 32 equals $V\pi$, as in the case with the first and second embodiment.

As described above, the simple configuration of the embodiment does not require any variable gain amplifier having a wide dynamic range and used to modulate its input signal. An operating point drift in the MZ type optical modulator caused by the ambient temperature or aging can be compensated so as to maintain the optimum operating point regardless of amplitude of an input signal to the MZ type optical modulator. The MZ type optical modulator can thus output a stable optical signal. This prevents the output optical extinction ratio from being degraded.

FOURTH EMBODIMENT

FIG. 15 is a block diagram showing an optical transmitting apparatus using an optical modulator control device and used for optical fiber communication according to a fourth embodiment of the present invention. In this figure, the optical modulator control device uses the optical duo binary modulating method. A circuit section of the optical modulator control device is composed of, for example, a multi-chip module formed of a plurality of semiconductor devices.

In FIG. 15, light emitted by the semiconductor laser 110 as a light source is inputted to the MZ type modulator 111 that is an external modulator. On the other hand, an externally inputted binary NRZ signal is supplied to a precoder 130 for encoding. An output signal from the precoder 130 has its amplitude modulated by a modulator driver 131. A low pass filter (LPF) 132 then converts the modulated signal into a ternary digital signal. This ternary signal adjusts a bias voltage in a bias T to generate a driving voltage for the MZ type modulator 111.

The MZ type modulator 111 modulates output light from the semiconductor laser 110 according to the driving signal. The output light from the MZ type modulator 111 is branched by the optical branching unit 112. One of the branched light signals is outputted from the optical coupler 123 to an optical fiber as an optical signal. The other branched light signal is inputted to the photodiode 113 used to monitor optical signals. The monitor PD 113 converts the inputted optical signal into a current proportional to optical power, and supplies the converted signal to the current/voltage converting type amplifier 114. This amplifier 114 converts the output current from the monitor PD 113 into a voltage to output an optical output monitor voltage Vav. The monitor PD 113 and the amplifier 114 detect the time average value Pav of optical output power from the MZ type modulator 111. It is thus unnecessary to have a quick response characteristic, which tends to incur high costs.

The output voltage Vav from the amplifier 114 is sent to a control section 135. The control section 135 is composed of an MCU (micro-control unit) 137, an A/D converter 136, and a D/A converters 138. The MCU 137 is operated by loading program data from the external memory M.

The MCU 137 uses the A/D converter 136 to convert the inputted voltage value Vav into a digital signal and then, for example, stores this signal in the memory area contained in the MCU 137. Subsequently, this voltage, which is inputted to a bias T 133 via the D/A converter 138 and the differential amplifier 119, is increased or reduced so as to slightly change the bias voltage (Vav stored in the memory area) for the MZ type modulator 111. Then, as described above, a voltage value Vav' obtained after the increase or decrease in bias voltage is referenced to determine a difference ΔVav between the voltage value Vav' and the voltage value Vav obtained before the increase or decrease. A bias control signal is generated on the basis of the difference ΔVav. The D/A converter 138 converts the bias control signal into an analog signal and sends this signal to the differential amplifier 119. The bias control signal is then amplified by the differential amplifier 119. The amplified signal is applied to the MZ modulator 111 via the bias T 133 as a DC bias voltage Vb.

Figure 16:
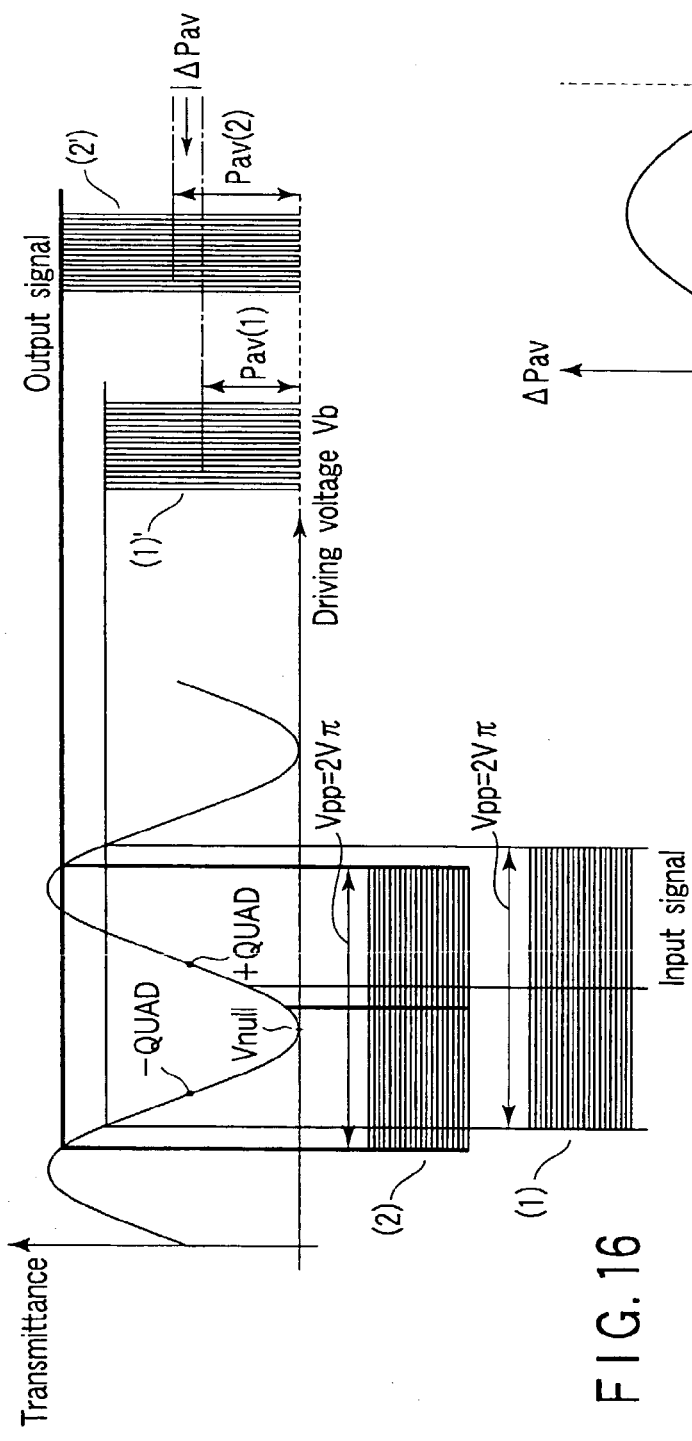
FIG. 16 is a characteristic diagram showing an example of the relationship (light transmittance) between an input driving voltage and an output optical signal observed if the magnitude of a DC bias voltage Vb for an MZ type modulator in FIG. 15 is varied.
Figure 17:
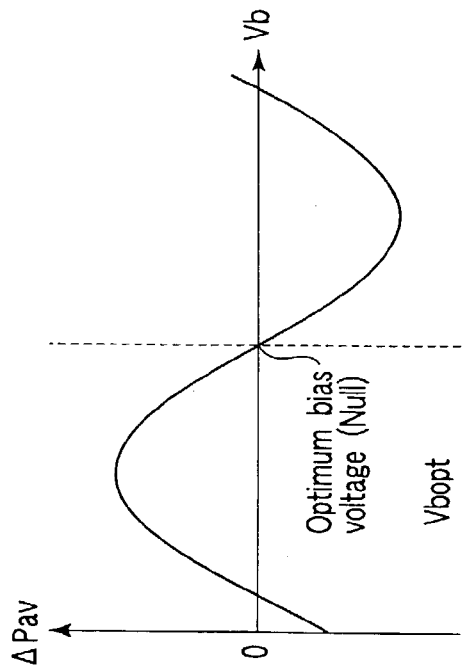
FIG. 17 is a characteristic diagram showing the relationship between the DC bias voltage Vb for the MZ type modulator shown in FIG. 15 and a difference ΔPav in average power output of output optical signals from the MZ type modulator.

With reference to FIGS. 16 and 17, description will be given below of the operational principle of a bias control method for the MZ type modulator 111 shown in FIG. 15 and used for the optical dup binary method.

FIG. 16 is a characteristic diagram showing an example of the relationship (light transmittance characteristic) between an input driving voltage and an output optical signal observed if the magnitude of the DC bias voltage Vb for the MZ type modulator 111, shown in FIG. 15, is varied.

FIG. 17 is a characteristic diagram showing the relationship between the DC bias voltage Vb for the MZ type modulator 111, shown in FIG. 15, and the difference ΔPav in average power output of output optical signals from the MZ type modulator 111.

FIG. 16 shows that the signal amplitude Vpp of an input voltage to the MZ type modulator 111 equals $2V\pi$. $V\pi$ is a difference between a driving voltage obtained when the light transmittance is at its maximum value (peak) and a driving voltage obtained when the light transmittance is at its minimum value (null). Further, in FIG. 16, +QUAD indicates a point at which the light transmittance has an intermediate value, between the maximum and minimum values, as well as a positive inclination. By contrast, −QUAD indicates a point at which the light transmittance has an intermediate value between the maximum and minimum values, as well as a negative inclination.

If the bias voltage Vb for the MZ type modulator 111 is at the optimum operating point Vnull (the bias voltage coinciding with the extinction peak of the curve for the driving voltage vs. optical output characteristic), a binary output optical signal is obtained from a ternary input signal (depending on a ternary signal outputted by the low pass filter 132).

However, the bias voltage Vb for the MZ type modulator 111 has a light transmittance characteristic shifted in the direction of abscissa in FIG. 16 owing to a DC drift (operating point drift).

In FIG. 16, reference numerals (1) and (1)' denote the relationship between an input voltage waveform and an output optical waveform observed if the bias voltage Vb for the MZ type modulator 111 is increased by a trace amount $\Delta V$ ($\Delta V > 0$) with respect to the preceding value. In this case, the time average value of output optical power is denoted as Pav(1).

Further, reference numerals (2) and (2)' denote the relationship between the input voltage waveform and the output optical waveform observed if the bias voltage Vb for the MZ type modulator 111 is reduced by the trace amount $\Delta V$ ($\Delta V > 0$) with respect to the preceding value. In this case, the time average value of output optical power is denoted as Pav(2).

The difference in time average value of output optical signal power (Pav(2)−Pav(1)) is denoted as ΔPav. In this case, reference numerals (1) and (2) in FIG. 16 indicate that the bias voltage Vb has been shifted toward the positive side (in the figure, rightward on the axis of abscissa) with respect to the optimum operating point Vnull because of a DC drift. This indicates that the Pav(1) observed with a larger drift toward the positive side with respect to the Vnull is lower than the Pav(2) observed with a smaller drift in the same direction.

By contrast, if the bias voltage Vb is shifted toward the negative side (in the figure, leftward on the abscissa) with respect to the optimum operating point Vnull because of a DC drift, the Pav(1) observed with a larger drift toward the negative side with respect to the Vnull is lower than the Pav(2) observed with a smaller drift in the same direction.

As described above, if a DC drift occurs, the amplitudes of the output optical signals (1)' and (2)' decrease compared to the case in which the bias voltage Vb is at the optimum operating point Vnull. As a result, the optical extinction ratio, optical power, or the like may be degraded. Therefore, the DC drift must be compensated.

That is, if a DC drift occurs, its magnitude is considered to be the magnitude of a change in driving voltage. Then, the DC drift must be compensated by changing the value of the driving voltage by the magnitude of the change in voltage. This compensation can be equivalently accomplished by changing the Vb by ΔVb.

In FIG. 17, the bias voltage Vbopt, resulting in the difference in average power ΔPav=0 is obtained if the light transmittance characteristic of the MZ type modulator 111 has the optimum relationship with the input signal to the modulator 111. The bias voltage Vbopt equals the Vnull (the bias voltage coinciding with the extinction peak of the curve for the voltage vs. optical output characteristic).

In this case, as shown in FIG. 16, if a DC drift causes the bias voltage Vb to lie at a more positive position with respect to the optimum value Vnull (the light transmittance characteristic of the MZ type modulator 111 shifts leftward from its optimum state), then ΔPav<0 if the Vb is increased or reduced by ΔV (ΔV>0) from its preceding value (moved further from or closer to the Vnull). By contrast, a DC drift causes the bias voltage Vb to lie at a more negative position with respect to the optimum value Vnull (the light transmittance characteristic of the MZ type modulator 111 shifts rightward from its optimum state), then ΔPav>0 if the Vb is increased or reduced by ΔV (ΔV>0) from its preceding value (moved further from or closer to the Vnull).

Consequently, the bias voltage Vb can be made equal to the optimum bias value Vnull by detecting the difference in average power ΔPav before and after an increase or decrease in Vb, determining the magnitude and direction of shift caused by the DC drift on the basis of the absolute value of the difference |ΔPav| and its polarity, and changing the Vb so as to zero the ΔPav.

Figure 18:
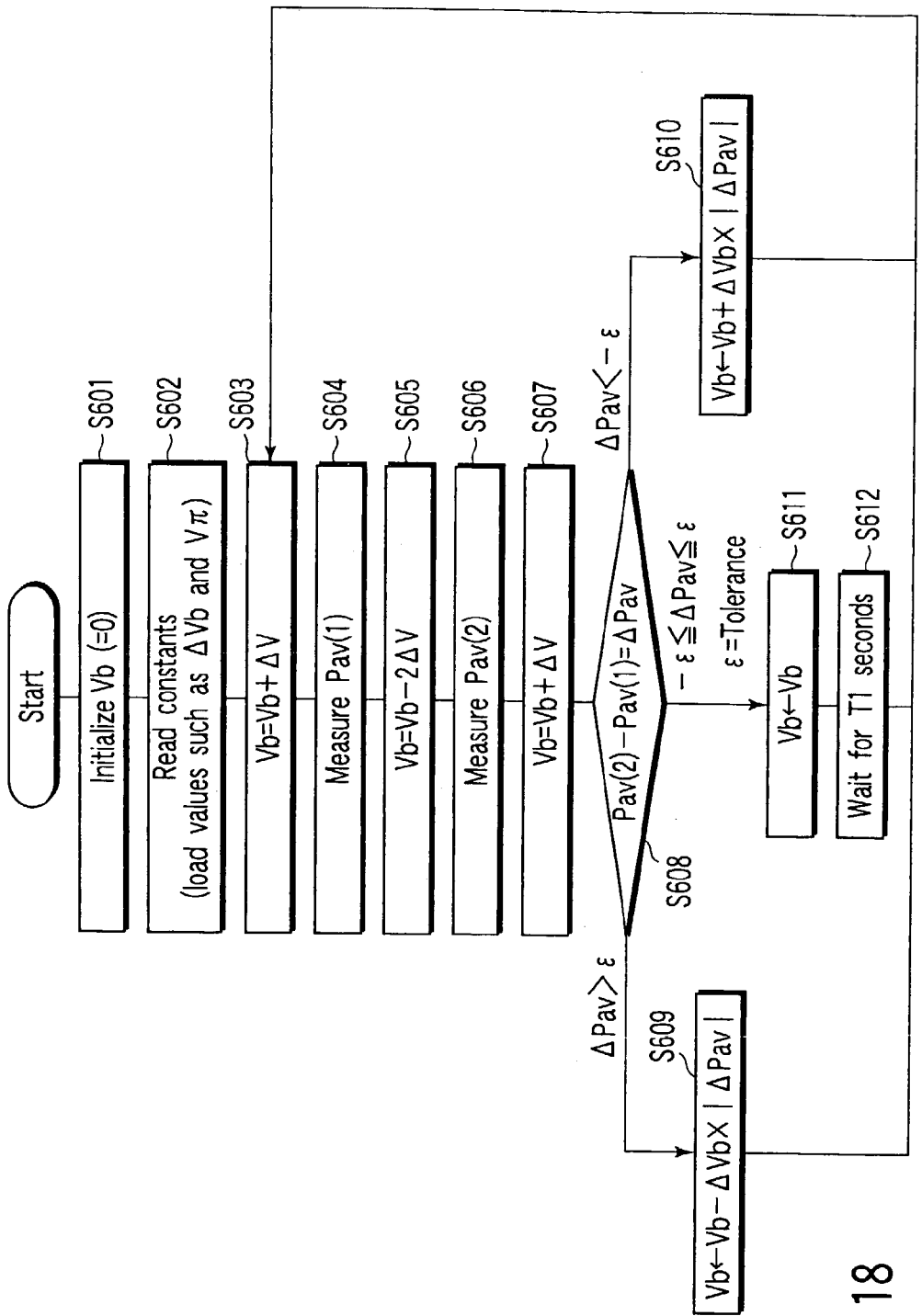
FIG. 18 is a flow chart showing an example of a control procedure executed by a control circuit of an optical modulating device in FIG. 15.
Figure 19A:
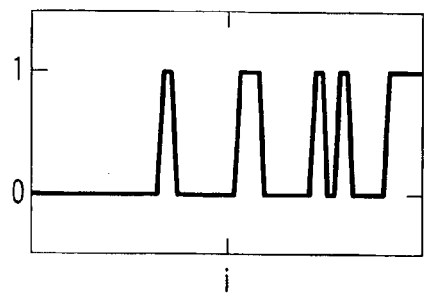
FIGS. 19A to 19H are diagrams showing the waveforms of signals from components of an optical duo binary modulating system as well as the eye patterns of these signals.
Figure 19B:
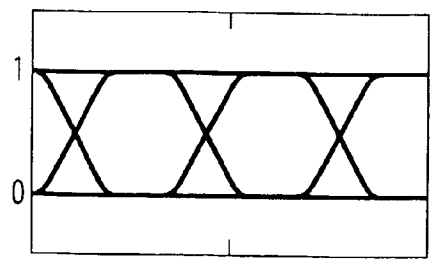
Figure 19C:
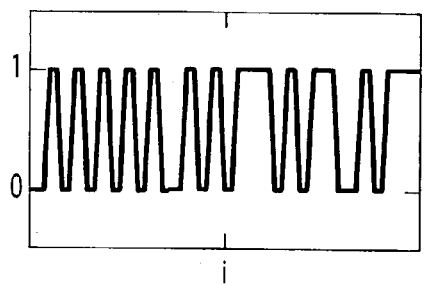
Figure 19D:
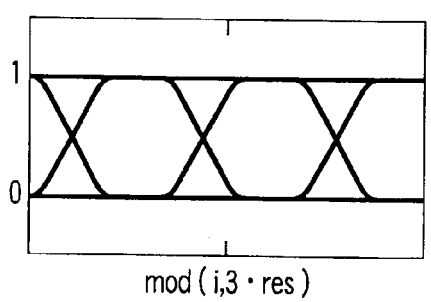
Figure 19E:
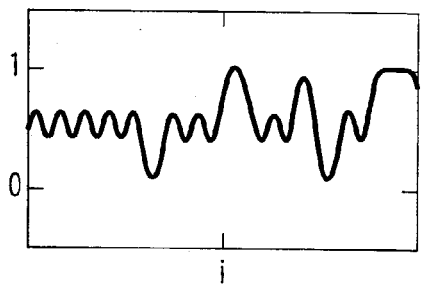
Figure 19F:
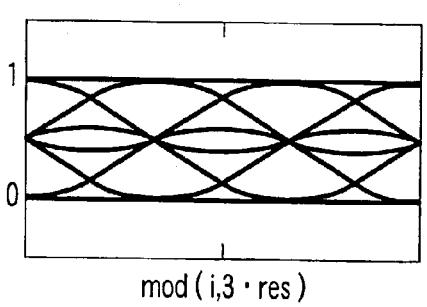
Figure 19G:
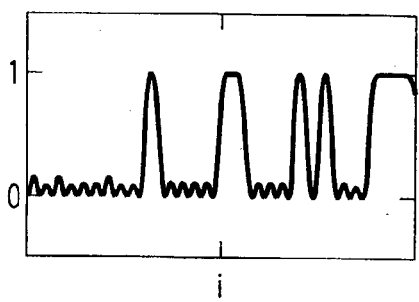
Figure 19H:
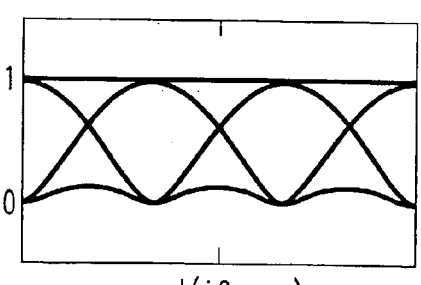
Figure 20:
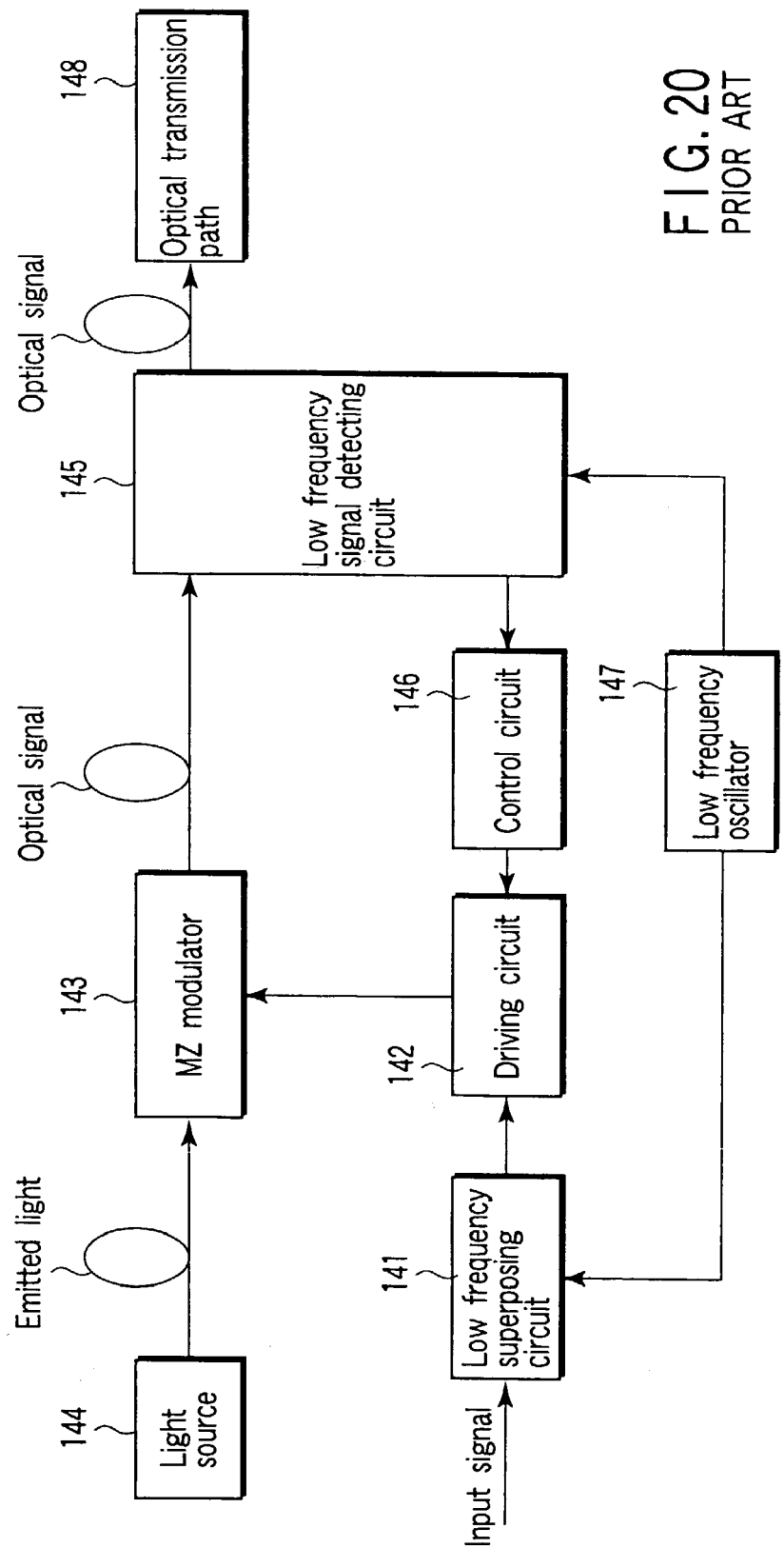
FIG. 20 is a block diagram showing an example of a conventional control method of compensating for a DC drift in an MZ modulator for allowing the modulator to operate stably.
Figure 21:
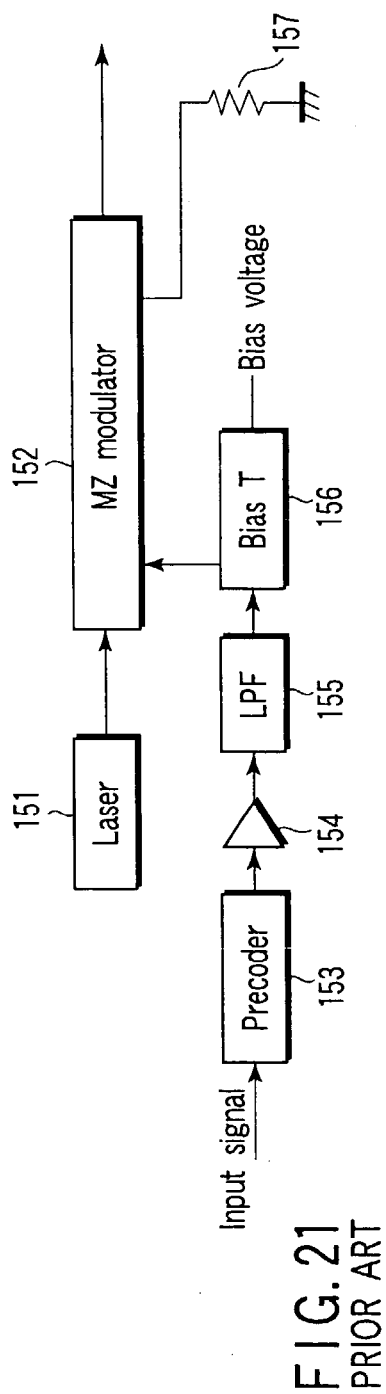
FIG. 21 is a block diagram showing a modulating section based on the conventional optical duo binary modulating method.
Figure 22:
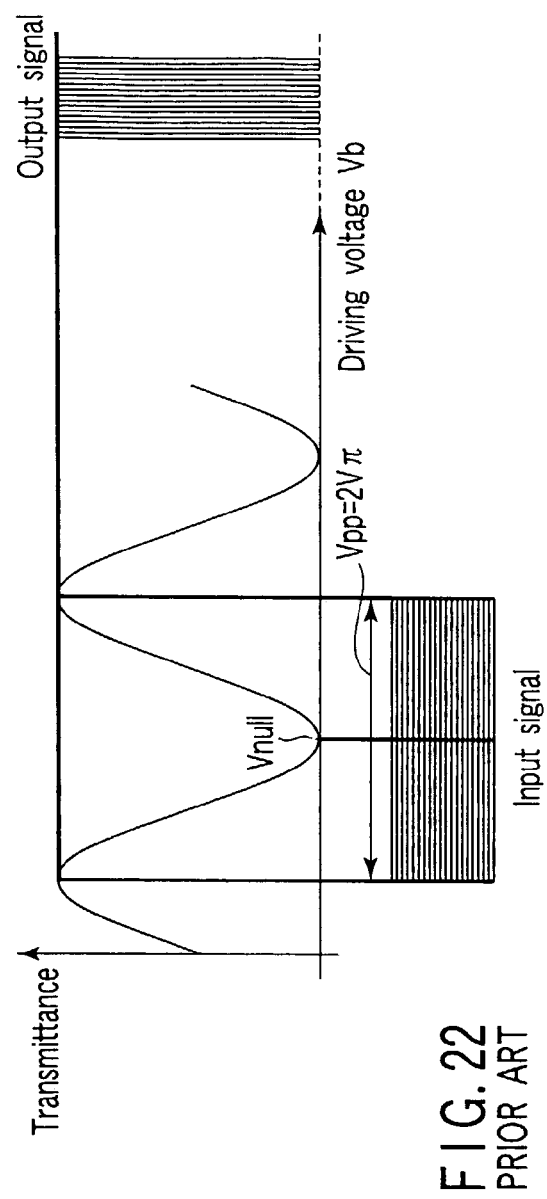
FIG. 22 is a diagram illustrating the operational principle of the optical duo binary modulating method.

FIG. 18 is a flow chart showing an example of a control procedure executed by the control section 135 of the optical modulating device shown in FIG. 15. This control is implemented by writing a control program from the external memory M in a program ROM of the MCU 137 and the MCU 137 executing this control program, as previously described.

Now, the control procedure will be described with reference to FIG. 18.

(1) At the first step S601, the bias voltage Vb is set to its initial value (normally 0V).

(2) At the second step S602, the constants required for control (such as ΔVb and Vπ) are read from the external memory M.

(3) At the third step S603, the Vb is increased by the magnitude of a very small change ΔV (>0) with respect to its initial value (Vb=Vb+ΔV).

(4) At the fourth step S604, the time average value (actually the voltage value Vav) of optical output power is referenced and stored as Pav(1) in the memory area contained in the MCU 113.

(5) At the fifth step S605, the Vb is reduced by the magnitude of the very small change ΔV with respect to its initial value (Vb=Vb−2ΔV).

(6) At the sixth step S606, the time average value (actually the voltage value Vav) of optical output power is referenced and stored as Pav(2) in the memory area contained in the MCU 137.

(7) At the seventh step S607, the Vb is returned to its initial value (Vb=Vb+ΔV).

(8) At the eighth step S608, the value ΔPav=Pav(2)−Pav(1) is calculated. A determining process is executed on this value. A branching process is then executed according to a result of the determining process (condition).

(9) When the ΔPav is larger than the tolerance ε (positive value), the Vb is reduced and set at Vb−ΔVb ×|ΔPav| (the ninth step S609). That is, the Vb is more sharply reduced as the |ΔPav| increases.

(10) When the ΔPav is smaller than the tolerance −ε, the Vb is increased and set at Vb+ΔVb×|ΔPav| (a tenth step S610). That is, the Vb is more sharply increased as the |ΔPav| increases.

(11) When the ΔPaV is equal to or smaller than ε and is equal to or larger than −ε, the Vb is considered to be at the optimum operating point. The value of the Vb is not changed (an eleventh step S611). The control is caused to stand by (wait) for the T1 seconds (a twelfth step S612). Subsequently, the procedure returns to the third step S603 to repeat the control in steps (3) to (11).

With the above control procedure, even if the optical transmission characteristic of the MZ type modulator 111 changes owing to a change in ambient temperature or aging, the Vb of the MZ type modulator 111 can be correspondingly correctively controlled to allow the modulator 111 to always perform the optimum operations.

If the order of an increase and a decrease by ΔV is reversed compared to the above example, i.e. if the Vb is reduced by ΔV with respect to its initial value at the third step S603, whereas the Vb is increased by ΔV with respect to its initial value at the fifth step S605, then the Vb may be increased by ΔVb×|ΔPav| when the ΔPav is larger than the ε. On the other hand, the Vb may be reduced by ΔVb×|ΔPav| when the ΔPav is smaller than the −ε.

That is, the optical modulating device of this embodiment comprises an optical modulator supplied with a driving voltage as a modulation input, the driving voltage corresponding to a ternary signal and centered at a DC bias voltage, the optical modulator outputting a binary optical signal, and a bias voltage determining section that determines the DC bias voltage on the basis of average optical output information representative of time average of optical outputs from the optical modulator. The bias voltage determining section determines the DC bias voltage on the basis of a difference between the average optical output power of the optical modulator obtained before a small increase or decrease in DC bias voltage and the average optical output power of the optical modulator obtained after the small increase or decrease.

As a specific example, an optical modulating device of a fourth embodiment comprises the optical modulator 111 which has a driving voltage-optical output characteristic indicated by a curve in which an emission peak or an extinction peak is periodically repeated, is provided with a driving voltage corresponding to a ternary signal and centered at a DC bias voltage, modulates input light according to the driving voltage, and outputs a binary optical signal, the DC bias generating circuit 133 which generates the DC bias voltage, and the driving circuit (130, 131, 132, 133) which converts a binary NRZ signal input into a ternary signal, generates a driving voltage on the basis of the ternary signal, the driving voltage having a signal amplitude corresponding to two adjacent periodic emission or extinction peaks of driving voltage-optical output characteristic of the optical modulator 111, superposes the driving voltage on the DC bias voltage, and supplies the superposed signal to the optical modulator 111. In this case, the optical duo binary modulating method is implemented by setting the signal amplitude of the driving voltage for the optical modulator, e.g. the MZ type modulator 111 at a value double the difference between the driving voltage obtained at the maximum value of the light transmittance and the driving voltage obtained at the minimum value of the light transmittance, and controlling the DC bias voltage on the basis of the result of detection of the difference in average optical output level so that the DC bias voltage coincides with a particular extinction peak (or emission peak) of driving voltage vs. optical output characteristic of the optical modulator 111.

Furthermore, the optical modulating device of the fourth embodiment is characterized by comprising the optical detecting circuit which detects an average optical output level representative of the time average of optical outputs from the optical modulator 111, and the control circuit 135 which determines the DC bias voltage on the basis of the difference between the average optical output power of the optical modulator detected before a slight increase or decrease in DC bias voltage and the average optical output power of the optical modulator detected after the slight increase or decrease.

In this case, the control circuit 135 includes a function of selectively generating a control signal serving to control the DC bias generating circuit so as to binarily increase or reduce the DC bias voltage around its current value at a frequency sufficiently lower than that of the ternary signal. The control circuit 135 detects the difference between the average optical output level detected by the optical detecting circuit 113 before a binary change in DC bias voltage and the average output level detected by the optical detecting circuit 113s after the binary change to correct the DC bias voltage by the appropriate amount in the appropriate direction on the basis of the result of the detection.

A specific example of the control circuit 135 is the micro-control unit 137. The micro-control unit 137 comprises a first control function of initializing the DC bias voltage Vb at 0 V, a second control function of reading the constants required for control from the external memory, a third control function of determining the difference between the time average value of optical output power obtained when the DC bias value Vb is increased by the unit magnitude of change $\Delta$Vb with respect to its preceding value and the time average value of optical output power obtained when the DC bias value Vb is reduced by the unit magnitude of change $\Delta$Vb with respect to its preceding value, and providing such control that if the absolute value of the $\Delta$Pav is equal to or larger than a predetermined value, the bias voltage Vb is changed in a direction depending on whether the $\Delta$Pav is positive or negative and that if the absolute value of the $\Delta$Pav is smaller than the predetermined value, the device is caused to stand by for a predetermined period, and a repetition control function of repeating the control provided by the third control function.

According to the optical modulating device configured as described above, if an operating point drift occurs in the MZ type modulator 111 because of the DC bias voltage applied to the MZ type optical modulator 111, the environment temperature, age deterioration, or the like, it can be compensated to control the MZ type modulator 111 to operate at the optimum operating point. It is thus possible to prevent degradation of the optical extinction ratio of an output optical signal from the modulator which degradation is associated with the operating point drift.

Further, the differential amplifier 119 is used to binarily change the magnitude of the DC bias voltage. It is thus unnecessary to have an expensive variable gain amplifier having a wide dynamic range. This allows the circuit configuration to be simplified and miniaturized. Moreover, synchronous detection is not required, thus further simplifying the circuit configuration. This serves to reduce the number of parts required, thus facilitating size reduction.

Furthermore, an optical transmitting apparatus according to an embodiment of the present invention comprises the optical modulating device according to any of the above-described embodiments, a light source that emits light inputted to the optical modulator, and a circuit that transmits an optical signal outputted by the optical modulator to an optical communication fiber. This provides the optical transmitting apparatus with the previously described characteristics of the optical modulating device.

Further, a method of controlling an optical modulator according to an embodiment of the present invention comprises binarily increasing or reducing the DC bias voltage of a driving voltage corresponding to a ternary signal supplied as a modulation input to the optical modulator, and controlling the DC bias voltage on the basis of the difference between the optical output average power of the optical modulator obtained before the increase or decrease and the optical output average power of the optical modulator obtained after the increase or decrease. This serves to implement an optical modulating device and optical transmitting apparatus comprising the previously described characteristics.

Furthermore, a method of controlling an optical modulator according to another embodiment of the present invention comprises a first function of providing the optical modulator with a driving voltage corresponding to a ternary signal and a DC bias voltage to cause the optical modulator to modulate input light according to the driving voltage and output an optical signal, a second function of detecting an average optical output power representative of time average of optical outputs from the optical modulator, and a third function including a function of generating a control signal serving to binarily change the DC bias voltage at a frequency sufficiently lower than that of the ternary signal, the third function comprising detecting the difference between the average optical output power detected by the second function before the binary change in DC bias voltage and the average optical output power detected by the second function after the binary change, and controlling the DC bias voltage on the basis of the result of the detection. This serves to implement an optical modulating device and optical transmitting apparatus comprising the previously described characteristics.

Moreover, a control program for an optical modulator according to another embodiment of the present invention causes the micro-control unit to implement a function of controlling the DC bias voltage on the basis of the difference between the optical output average power of the optical modulator obtained before a binary increase or decrease in the DC bias voltage for the optical modulator and the optical output average power of the optical modulator obtained after the binary increase or decrease. This serves to implement a method of controlling an optical modulating device comprising the previously described characteristics.

Further, a control program for an optical modulator according to another embodiment of the present invention causes the micro-control unit to implement a function of detecting an average optical output lever representative of time average of optical signals outputted by the optical modulator to which a driving voltage corresponding to a ternary signal and centered at a DC bias voltage is supplied as a modulation input, a function of generating a control signal serving to binarily change the DC bias voltage at a frequency sufficiently lower than that of an input signal, and a function of detecting the difference between the average optical output level detected before a binary change in the magnitude of the DC bias voltage and the average optical output level detected after the binary change and controlling the DC bias voltage for the optical modulator on the basis of the result of the detection. This serves to implement a method of controlling an optical modulating device comprising the previously described characteristics.

As described above, with the optical modulator control device, the optical transmitting apparatus, the method of controlling an optical modulator, and its control program according to the embodiments of the present invention, the simple device configuration can be used to stabilize output optical signals even if the characteristics of the optical modulator are varied by the ambient temperature or aging.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical modulating device comprising:
an output variable driving circuit which generates a driving voltage corresponding to an input signal which is a binary digital signal;
a Mach Zehnder type optical modulator which is driven by an amplitude of the input signal between a light emission and an adjacent light extinction culmination of a voltage-optical output characteristic and which is provided with the driving voltage and a DC bias voltage, to modulate input light according to the driving voltage to convert the input signal into an optical signal;
an optical detecting circuit which detects an average optical output level representative of a time average of optical signals outputted by the Mach Zehnder type optical modulator; and
a control circuit which includes a function of generating a control signal serving to binarily change an amplitude of output from the output variable driving circuit at a frequency sufficiently lower than that of the input signal and which detects a difference between an average optical output level detected by the optical detecting circuit before a binary change in the amplitude of the input signal and an average output level detected by the optical detecting circuit after the binary change to control the DC bias voltage on the basis of a result of the detection for maintaining the difference within a predetermined tolerance value,
wherein the control circuit comprises:
a micro-control unit;
a first control circuit which initializes the bias voltage Vb to 0V;
a second control circuit which reads constants required for control from an external memory;
a third control circuit which sets an output amplitude Vpp of the output variable driving circuit at $V\pi$;
a fourth control circuit which references the time average value of optical output power after the control executed by the third control circuit and stores the time average value as first average optical output power Pav1 in a memory area or the like contained in the micro-control unit;
a fifth control circuit which sets the output amplitude Vpp of the output variable driving circuit at $V\pi+\Delta V$;
a sixth control circuit which references the time average value of optical output power after the control executed by the fifth control circuit and stores the time average value as second average optical output power Pav2 in the memory area or the like contained in the micro-control unit;
a seventh control circuit which calculates a difference between the two average optical output power values $\Delta Pav=(Pav2-Pav1)$ and conditionally branches operations;
an eighth control circuit which provides, when the $\Delta Pav$ is larger than a tolerance $\epsilon$(positive value), such control as increases and sets the Vb at $Vb+\Delta Vb\times\Delta Pav$ ($\Delta Vb>0$), which provides, when the $\Delta Pav$ is smaller than a tolerance $-\epsilon$, such control as reduces and sets the Vb at $Vb-\Delta Vb$, and which operates when the $\Delta Pav$ is equal to or smaller than a and is equal to or larger than $-\epsilon$, to consider the Vb to be at an optimum operating point, avoid changing the bias voltage Vb, and cause the control to stand by for a predetermined period; and
a ninth control circuit which repeats the control executed by the third control circuit to the eighth control circuit, after the control by the eighth control circuit.

2. An optical transmitting apparatus comprising:
an optical modulating device according to claim 1;
a light source which emits light inputted to the Mach Zehnder type optical modulator; and
an optical output circuit which transmits an optical signal outputted by the Mach Zehnder type optical modulator, to an optical communication fiber.

3. An optical modulating device comprising:
an optical modulator which has a driving voltage-optical output characteristic indicated by a curve in which an emission peak or an extinction peak is periodically repeated, is provided with a driving voltage corresponding to a ternary signal and centered at a DC bias voltage, modulates input light according to the driving voltage, and outputs a binary optical signal;
a DC bias generating circuit which generates the DC bias voltage;
a driving circuit which converts a binary NRZ signal input into a ternary signal, generates a driving voltage on the basis of the ternary signal the driving voltage having a signal amplitude corresponding to two adjacent periodic emission or extinction peaks of driving voltage-optical output characteristic of the optical modulator, superposes the driving voltage on the DC bias voltage generated by the DC bias generating circuit, and supplies the superposed signal to the optical modulator;
an optical detector which detects an average optical output level representative of a time average of optical outputs from the optical modulator; and a control circuit which determines the DC bias voltage on the basis of a difference between average optical output power of the optical modulator detected before a slight increase or decrease in DC bias voltage and average optical output power of the optical modulator detected after the slight increase or decrease, wherein the control circuit includes a micro-control unit which comprises;

a first control circuit which initializes the DC bias voltage to Vb at 0V;

a second control circuit which reads constants required for control from an external memory;

a third control circuit which determines a difference ΔVb between optical output power obtained by increasing the DC bias voltage Vb by the unit magnitude of a change ΔVb with respect to a preceding value and optical output power obtained by reducing the DC bias voltage Vb by the unit magnitude of a change ΔVb with respect to the preceding value, and when an absolute value for the ΔPav is equal to or larger than a predetermined value, provides such control as changes the bias voltage Vb according to the magnitude of the absolute value in a direction which depends on whether the ΔPav is positive or negative, and when the absolute value of the ΔPav is smaller than the predetermined value, causes the device to stand by for a predetermined period; and a repeating control circuit which repeats the control executed by the third control circuit, and wherein the third control circuit comprises:

a fourth control circuit which sets the DC bias voltage Vb to be higher than the preceding value by the unit magnitude of a change ΔVb;

a fifth control circuit which references a time average value for optical output power after the control executed by the fourth control circuit and stores the time average value as average optical output power Pav(1) in a memory area contained in a micro-control unit;

a sixth control circuit which sets the DC bias voltage Vb to be lower than a value set by the fourth control circuit by 2ΔVb;

a seventh control circuit which references a time average value for optical output power after the control executed by the sixth control circuit and stores the time average value as average optical output power Pav(2) in the memory area contained in the micro-control unit;

an eighth control circuit which returns the DC bias voltage Vb to a value present before the fourth control circuit sets the value, calculates a difference between the two average optical output power values ΔPav (=Pav(2)−Pav(1)), and conditionally branches the process according to the difference value, and a ninth control circuit which provides, when the ΔPav is larger than a tolerance ϵ(positive value), such control as reduces and sets the Vb at Vb −ΔVb×ΔPav, which provides, when the ΔPav is smaller than a tolerance −ϵ, such control as increases and sets the Vb at Vb+ΔVb× ΔPav, and which operates when the ΔPaV is equal to or smaller than s and is equal to or larger than −ϵ, to consider the Vb to be at an optimum operating point, avoid changing the bias voltage Vb, and cause the control to stand by for a predetermined period.

4. The optical modulating device comprising:

an optical modulator which has a driving voltage-optical output characteristic indicated by a curve in which an emission peak or an extinction peak is periodically repeated, is provided with a driving voltage corresponding to a ternary signal and centered at a DC bias voltage, modulates input light according to the driving voltage, and outputs a binary optical signal;

a DC bias generating circuit which generates the DC bias voltage;

a driving circuit which converts a binary NRZ signal input into a ternary signal, generates a driving voltage on the basis of the ternary signal, the driving voltage having a signal amplitude corresponding to two adjacent periodic emission or extinction peaks of driving voltage-optical output characteristic of the optical modulator, superposes the driving voltage on the DC bias voltage generated by the DC bias generating circuit, and supplies the superposed signal to the optical modulator;

an optical detector which detects an average optical output level representative of a time average of optical outputs from the optical modulator; and a control circuit which determines the DC bias voltage on t he basis of a difference between average optical output power of the optical modulator detected before a slight increase or decrease in DC bias voltage and average optical output power of the optical modulator detected after the slight increase or decrease, wherein the control circuit includes a micro-control unit which comprises:

a first control circuit which initializes the DC bias voltage to Vb at 0V:

a second control circuit which reads constants required for control from an external memory;

a third control circuit which determines a difference ΔVb between optical output power obtained by increasing the DC bias voltage Vb by the unit magnitude of a change ΔVb with respect to a preceding value and optical output power obtained by reducing the DC bias voltage Vb by the unit magnitude of a change ΔVb, with respect to the preceding value, and when an absolute value for the ΔPav is equal to or larger than a predetermined value, provides such control as changes the bias voltage Vb according to the magnitude of the absolute value in a direction which depends on whether the ΔPav is positive or negative, and when the absolute value of the ΔPav is smaller than the predetermined value, causes the device to stand by for a predetermined period; and a repeating control circuit which repeats the control executed by the third control circuit, and wherein the third control circuit comprises:

a fourth control circuit which sets the DC bias voltage Vb to be lower than the preceding value by the unit magnitude of a change ΔVb;

a fifth control circuit which references a time average value for optical output power after the control executed by the fourth control circuit and stores the time average value as average optical output power Pav(1) in a memory area contained in a micro-control unit;

a sixth control circuit which sets the DC bias voltage Vb to be higher than a value set by the fourth control circuit by 2ΔVb;

a seventh control circuit which references a time average value for optical output power after the control executed by the sixth control circuit and stores the time average value as average optical output power Pav(2) in the memory area contained in the micro-control unit;

an eighth control circuit which returns the DC bias voltage Vb to a value present before the fourth control circuit sets the value, calculates a difference between the two average optical output power values ΔPav (=Pav(2)−Pav(1)), and conditionally branches the process according to the difference value, and a ninth control circuit which provides, when the $\Delta Pav$ is larger than a tolerance $\epsilon$ (positive value), such control as increases the Vb by $\Delta Vb \times \Delta Pav$, which provides, when the $\Delta Pav$ is smaller than a tolerance $-\epsilon$, such control as reduces the Vb by $\Delta Vb \times \Delta Pav$, and which operates when the $\Delta Pav$ is equal to or smaller than $\epsilon$ and is equal to or larger than $-\epsilon$, to consider the Vb to be at an optimum operating point, avoid changing the bias voltage Vb, and cause the control to stand by for a predetermined period.

* * * * *